US009013264B2

(12) United States Patent
Parshionikar et al.

(10) Patent No.: US 9,013,264 B2
(45) Date of Patent: Apr. 21, 2015

(54) MULTIPURPOSE CONTROLLER FOR ELECTRONIC DEVICES, FACIAL EXPRESSIONS MANAGEMENT AND DROWSINESS DETECTION

(75) Inventors: Uday Parshionikar, Mason, OH (US); Mihir Parshionikar, Mason, OH (US)

(73) Assignee: Perceptive Devices, LLC, Mason, OH (US)

( * ) Notice: Subject to any disclaimer, the term of this patent is extended or adjusted under 35 U.S.C. 154(b) by 0 days.

(21) Appl. No.: 13/418,331

(22) Filed: Mar. 12, 2012

(65) Prior Publication Data

US 2012/0229248 A1 Sep. 13, 2012

Related U.S. Application Data

(60) Provisional application No. 61/452,086, filed on Mar. 12, 2011, provisional application No. 61/552,124, filed on Oct. 27, 2011, provisional application No. 61/603,947, filed on Feb. 28, 2012.

(51) Int. Cl.
*G05B 23/02* (2006.01)
*G08B 21/06* (2006.01)

(52) U.S. Cl.
CPC ..................................... *G08B 21/06* (2013.01)

(58) Field of Classification Search
USPC ............ 340/3.1; 345/157, 163, 156; 382/182, 382/103, 118; 351/200
See application file for complete search history.

(56) References Cited

U.S. PATENT DOCUMENTS

| | | | |
|---|---|---|---|
| 4,144,531 | A | 3/1979 | Anbergen |
| 4,565,999 | A | 1/1986 | King et al. |
| 4,967,186 | A | 10/1990 | Ludmirsky et al. |

(Continued)

FOREIGN PATENT DOCUMENTS

| | | |
|---|---|---|
| EP | 2447808 A1 | 5/2012 |
| WO | 2014/043529 | 12/2014 |

OTHER PUBLICATIONS

Manresa-Yee et al., "Face-Based Perceptual Interface for Computer Human Interaction," Short Communication proceedings, ISBN 80-86943-05-4, WSCG'2006, Jan. 30-Feb. 3, 2006.

(Continued)

*Primary Examiner* — Steven Lim
*Assistant Examiner* — Hongmin Fan
(74) *Attorney, Agent, or Firm* — Taft Stettinius & Hollister LLP; Anthony P. Filomena, III

(57) ABSTRACT

A hands-free controller, a facial expression management system, a drowsiness detection system and methods for using them are disclosed. The controller monitors facial expressions of the user, monitors motions of the user's body, generates commands for an electronic device based on the monitored facial expressions and body motions, and communicates the commands to the electronic device. Monitoring facial expressions can include sensing facial muscle motions using facial expression sensors. Monitoring user body motions can include sensing user head motions. Facial expression management can includes monitoring user facial expressions, storing monitored expressions, and communicating monitored expressions to an electronic device. Drowsiness detection can include monitoring eye opening of the user, generating an alert when drowsiness is detected, monitoring proper usage of the device, and generating a warning when improper usage is detected.

85 Claims, 18 Drawing Sheets

(56) References Cited

U.S. PATENT DOCUMENTS

| | | | | |
|---|---|---|---|---|
| 5,162,781 | A | 11/1992 | Cambridge | |
| 5,192,254 | A * | 3/1993 | Young | 482/8 |
| 5,360,971 | A | 11/1994 | Kaufman et al. | |
| 5,367,315 | A | 11/1994 | Pan | |
| 5,367,631 | A | 11/1994 | Levy | |
| 5,373,857 | A | 12/1994 | Travers et al. | |
| 5,402,109 | A | 3/1995 | Mannik | |
| 5,410,376 | A | 4/1995 | Cornsweet et al. | |
| 5,440,326 | A | 8/1995 | Quinn | |
| 5,469,143 | A | 11/1995 | Cooper | |
| 5,481,622 | A | 1/1996 | Gerhardt et al. | |
| 5,734,371 | A | 3/1998 | Kaplan | |
| 5,774,591 | A | 6/1998 | Black et al. | |
| 5,835,077 | A | 11/1998 | Dao et al. | |
| 5,844,824 | A | 12/1998 | Newman et al. | |
| 5,898,421 | A | 4/1999 | Quinn | |
| 6,009,210 | A | 12/1999 | Kang | |
| 6,097,374 | A | 8/2000 | Howard | |
| 6,127,990 | A | 10/2000 | Zwern | |
| 6,152,563 | A | 11/2000 | Hutchinson et al. | |
| 6,175,610 | B1 | 1/2001 | Peter | |
| 6,184,847 | B1 | 2/2001 | Fateh et al. | |
| 6,215,471 | B1 | 4/2001 | DeLuca | |
| 6,244,711 | B1 | 6/2001 | Fateh et al. | |
| 6,254,536 | B1 | 7/2001 | DeVito | |
| 6,280,436 | B1 | 8/2001 | Freeman et al. | |
| 6,369,799 | B1 | 4/2002 | Miceli et al. | |
| 6,424,410 | B1 | 7/2002 | Pelosi | |
| 6,452,606 | B1 | 9/2002 | Luzzatto | |
| 6,466,673 | B1 | 10/2002 | Hardy | |
| 6,545,664 | B1 | 4/2003 | Kim | |
| 6,559,770 | B1 | 5/2003 | Zoerb | |
| 6,573,883 | B1 | 6/2003 | Bartlett | |
| 6,577,298 | B2 | 6/2003 | Krog | |
| 6,583,781 | B1 | 6/2003 | Joshi et al. | |
| 6,603,491 | B2 | 8/2003 | Lemelson et al. | |
| 6,606,111 | B1 | 8/2003 | Kondo et al. | |
| 6,637,883 | B1 | 10/2003 | Tengshe et al. | |
| 6,654,001 | B1 | 11/2003 | Su | |
| 6,668,244 | B1 | 12/2003 | Rourke et al. | |
| 6,677,969 | B1 | 1/2004 | Hongo | |
| 6,806,863 | B1 | 10/2004 | Howard | |
| 6,825,873 | B2 | 11/2004 | Nakamura et al. | |
| 6,861,946 | B2 | 3/2005 | Verplaetse et al. | |
| 6,879,896 | B2 | 4/2005 | Martens | |
| 6,965,828 | B2 | 11/2005 | Pollard et al. | |
| 7,030,856 | B2 | 4/2006 | Dawson et al. | |
| 7,071,831 | B2 | 7/2006 | Johns | |
| 7,092,001 | B2 | 8/2006 | Schulz | |
| 7,109,975 | B2 | 9/2006 | Fedorak et al. | |
| 7,154,475 | B2 | 12/2006 | Crew | |
| 7,158,118 | B2 | 1/2007 | Liberty | |
| 7,187,370 | B2 | 3/2007 | Lapstun et al. | |
| 7,197,165 | B2 | 3/2007 | Ryan | |
| 7,209,569 | B2 | 4/2007 | Boesen | |
| 7,209,574 | B2 | 4/2007 | Tafuku et al. | |
| 7,233,684 | B2 | 6/2007 | Federovskaya et al. | |
| 7,236,156 | B2 | 6/2007 | Liberty et al. | |
| 7,239,301 | B2 | 7/2007 | Liberty et al. | |
| 7,262,760 | B2 | 8/2007 | Liberty | |
| 7,265,693 | B2 | 9/2007 | Yi | |
| 7,295,184 | B2 | 11/2007 | Suprun et al. | |
| 7,298,360 | B2 | 11/2007 | Howard | |
| 7,301,527 | B2 | 11/2007 | Marvit | |
| 7,301,648 | B2 | 11/2007 | Foxlin | |
| RE40,014 | E | 1/2008 | Edwards | |
| 7,319,780 | B2 | 1/2008 | Federovskaya et al. | |
| 7,414,611 | B2 | 8/2008 | Liberty | |
| 7,469,381 | B2 | 12/2008 | Ording | |
| 7,479,949 | B2 | 1/2009 | Jobs et al. | |
| 7,489,298 | B2 | 2/2009 | Liberty et al. | |
| 7,489,299 | B2 | 2/2009 | Liberty | |
| 7,489,979 | B2 | 2/2009 | Rosenberg | |
| 7,515,054 | B2 | 4/2009 | Torch | |
| 7,518,595 | B2 | 4/2009 | Tachikawa | |
| 7,523,084 | B2 | 4/2009 | Sawada | |
| 7,535,456 | B2 | 5/2009 | Liberty et al. | |
| 7,552,403 | B2 | 6/2009 | Wilson | |
| 7,580,540 | B2 | 8/2009 | Zurek et al. | |
| 7,587,069 | B2 | 9/2009 | Movellan et al. | |
| 7,636,645 | B1 | 12/2009 | Yen et al. | |
| 7,639,233 | B2 | 12/2009 | Marks | |
| 7,657,849 | B2 | 2/2010 | Chaudhri et al. | |
| 7,692,627 | B2 | 4/2010 | Wilson | |
| 7,692,637 | B2 | 4/2010 | Davis | |
| 7,710,395 | B2 | 5/2010 | Rodgers et al. | |
| 7,716,008 | B2 | 5/2010 | Ohta | |
| 7,746,321 | B2 | 6/2010 | Banning | |
| 7,762,665 | B2 | 7/2010 | Vertegaal et al. | |
| 7,768,498 | B2 | 8/2010 | Wey | |
| 7,768,499 | B2 | 8/2010 | Sturtz | |
| 7,774,155 | B2 | 8/2010 | Sato et al. | |
| 7,789,752 | B2 | 9/2010 | Okada | |
| 7,840,035 | B2 | 11/2010 | Takeda et al. | |
| 7,844,915 | B2 | 11/2010 | Platzer et al. | |
| 7,849,421 | B2 | 12/2010 | Yoo et al. | |
| 7,854,655 | B2 | 12/2010 | Mao et al. | |
| 7,860,676 | B2 | 12/2010 | Sheng et al. | |
| 7,881,902 | B1 | 2/2011 | Kahn et al. | |
| 7,934,156 | B2 | 4/2011 | Forstall et al. | |
| RE42,336 | E | 5/2011 | Fateh et al. | |
| 8,018,440 | B2 | 9/2011 | Townsend et al. | |
| 8,046,721 | B2 | 10/2011 | Chaudhri et al. | |
| 8,094,891 | B2 | 1/2012 | Andreasson | |
| 8,130,205 | B2 | 3/2012 | Forstall et al. | |
| 8,135,183 | B2 | 3/2012 | Hu et al. | |
| 8,150,102 | B2 | 4/2012 | Zheng et al. | |
| 8,176,442 | B2 | 5/2012 | Poot | |
| 8,184,067 | B1 | 5/2012 | Braun et al. | |
| 8,184,070 | B1 | 5/2012 | Taubman | |
| 8,185,845 | B2 | 5/2012 | Bjorklund et al. | |
| 8,203,502 | B1 | 6/2012 | Chi et al. | |
| 8,203,530 | B2 | 6/2012 | Chiang | |
| 8,235,529 | B1 | 8/2012 | Raffle et al. | |
| 8,933,876 | B2 | 1/2015 | Galor et al. | |
| 2001/0038378 | A1 | 11/2001 | Zwern | |
| 2002/0158827 | A1 | 10/2002 | Zimmerman | |
| 2003/0011573 | A1 | 1/2003 | Villet et al. | |
| 2003/0046401 | A1 | 3/2003 | Abbott et al. | |
| 2003/0107551 | A1 | 6/2003 | Dunker | |
| 2003/0169907 | A1 | 9/2003 | Edwards et al. | |
| 2004/0140962 | A1 | 7/2004 | Wang et al. | |
| 2004/0243416 | A1 | 12/2004 | Gardos | |
| 2005/0047662 | A1* | 3/2005 | Gorodnichy | 382/218 |
| 2005/0116929 | A1 | 6/2005 | Molander et al. | |
| 2005/0212767 | A1 | 9/2005 | Marvit et al. | |
| 2005/0243054 | A1* | 11/2005 | Beymer et al. | 345/156 |
| 2006/0011399 | A1 | 1/2006 | Brockway et al. | |
| 2006/0033701 | A1 | 2/2006 | Wilson | |
| 2006/0149167 | A1 | 7/2006 | Yeh et al. | |
| 2006/0209013 | A1 | 9/2006 | Fengels | |
| 2007/0066393 | A1 | 3/2007 | Paul et al. | |
| 2007/0066914 | A1 | 3/2007 | Le et al. | |
| 2007/0100937 | A1 | 5/2007 | Burtner, IV et al. | |
| 2007/0131031 | A1 | 6/2007 | Tsai et al. | |
| 2007/0173733 | A1 | 7/2007 | Le et al. | |
| 2007/0179396 | A1 | 8/2007 | Le et al. | |
| 2007/0225585 | A1 | 9/2007 | Washbon et al. | |
| 2007/0297618 | A1 | 12/2007 | Nurmi | |
| 2008/0018598 | A1 | 1/2008 | Marsden | |
| 2008/0024433 | A1 | 1/2008 | Gunther et al. | |
| 2008/0076972 | A1 | 3/2008 | Dorogker et al. | |
| 2008/0084385 | A1 | 4/2008 | Ranta | |
| 2008/0129550 | A1 | 6/2008 | McRae | |
| 2008/0130408 | A1 | 6/2008 | Pfaffinger | |
| 2008/0143676 | A1 | 6/2008 | Choi et al. | |
| 2008/0159596 | A1 | 7/2008 | Li et al. | |
| 2008/0169930 | A1 | 7/2008 | Mallinson | |
| 2008/0211768 | A1 | 9/2008 | Breen et al. | |
| 2008/0218472 | A1 | 9/2008 | Breen et al. | |
| 2008/0231926 | A1 | 9/2008 | Klug et al. | |
| 2008/0266257 | A1 | 10/2008 | Chiang | |
| 2008/0285791 | A1 | 11/2008 | Suzuki et al. | |
| 2009/0009588 | A1 | 1/2009 | Shaffer et al. | |

(56) References Cited

U.S. PATENT DOCUMENTS

| | | | | |
|---|---|---|---|---|
| 2009/0049388 | A1 | 2/2009 | Taib et al. | |
| 2009/0097689 | A1 | 4/2009 | Prest et al. | |
| 2009/0110246 | A1 | 4/2009 | Olsson et al. | |
| 2009/0153366 | A1 | 6/2009 | Im et al. | |
| 2009/0153478 | A1 | 6/2009 | Kerr et al. | |
| 2009/0153482 | A1 | 6/2009 | Weinberg et al. | |
| 2009/0217211 | A1 | 8/2009 | Hildreth et al. | |
| 2009/0295729 | A1 | 12/2009 | Kuo et al. | |
| 2009/0295738 | A1 | 12/2009 | Chiang | |
| 2010/0039394 | A1 | 2/2010 | Moussavi | |
| 2010/0125816 | A1 | 5/2010 | Bezos | |
| 2010/0165091 | A1 | 7/2010 | Teranishi et al. | |
| 2010/0261526 | A1 | 10/2010 | Anderson et al. | |
| 2010/0292943 | A1 | 11/2010 | Minor et al. | |
| 2010/0296701 | A1 | 11/2010 | Hu | |
| 2010/0315329 | A1 | 12/2010 | Previc et al. | |
| 2011/0001699 | A1 | 1/2011 | Jacobsen et al. | |
| 2011/0007142 | A1 | 1/2011 | Perez et al. | |
| 2011/0038547 | A1 | 2/2011 | Hill | |
| 2011/0063217 | A1 | 3/2011 | Kong | |
| 2011/0074680 | A1 | 3/2011 | Moore | |
| 2011/0100853 | A1 | 4/2011 | Ciudad et al. | |
| 2011/0112771 | A1 | 5/2011 | French | |
| 2011/0125021 | A1 | 5/2011 | Sudol | |
| 2011/0125063 | A1 | 5/2011 | Shalon et al. | |
| 2011/0158546 | A1 | 6/2011 | Huang et al. | |
| 2011/0185309 | A1 | 7/2011 | Challinor et al. | |
| 2011/0187640 | A1 | 8/2011 | Jacobsen et al. | |
| 2011/0202834 | A1 | 8/2011 | Mandryk et al. | |
| 2011/0214082 | A1 * | 9/2011 | Osterhout et al. | ............ 715/773 |
| 2011/0221669 | A1 | 9/2011 | Shams et al. | |
| 2011/0227812 | A1 | 9/2011 | Haddick et al. | |
| 2011/0227820 | A1 | 9/2011 | Haddick et al. | |
| 2012/0001846 | A1 | 1/2012 | Taniguchi et al. | |
| 2012/0051597 | A1 | 3/2012 | Fogt | |
| 2012/0078635 | A1 | 3/2012 | Rothkopf et al. | |
| 2012/0081282 | A1 | 4/2012 | Chin | |
| 2012/0105324 | A1 | 5/2012 | Lee et al. | |
| 2012/0105616 | A1 | 5/2012 | Rios | |
| 2012/0188245 | A1 | 7/2012 | Hyatt | |
| 2012/0206603 | A1 | 8/2012 | Rekimto | |
| 2012/0242818 | A1 | 9/2012 | Chiang et al. | |
| 2012/0256833 | A1 | 10/2012 | Chiang | |
| 2012/0260177 | A1 | 10/2012 | Sehrer | |
| 2012/0274594 | A1 | 11/2012 | Prest et al. | |
| 2012/0287163 | A1 | 11/2012 | Djavaherian | |
| 2012/0287284 | A1 | 11/2012 | Jacobsen et al. | |
| 2012/0290961 | A1 | 11/2012 | Schlegel | |
| 2012/0299870 | A1 | 11/2012 | Chi et al. | |
| 2013/0044055 | A1 | 2/2013 | Karmarkar et al. | |
| 2013/0096575 | A1 | 4/2013 | Olson | |
| 2014/0298176 | A1 | 10/2014 | Bull et al. | |

OTHER PUBLICATIONS

Manresa-Yee et al., "User Experience to improve Usability of a vision based interface," Interacting with Computers 22 (2010) 594-605; Elsevier, 2010.

Martins et al., "Accurate Single View Model Based Head Pose Estimation," Automatic Face & Gesture Recognition, 2008. FG '08. 8th IEEE International Conference on, pp. 1-6, Sep. 2008.

Martins, "Active Appearance Model for Facial Expression Recognition and Monocular Head Pose Estimation—MS thesis," University of Coimbra, http://www2.isr.uc.pt/~pedromartins/Publications/pmartins_MScThesis.pdf, Jun. 2008.

Mendoza, "A contribution to mouth structure segmentation—Doctoral Dissertation," Universidad Nacional de Colombia Sede Bogota, http://theses.insa-lyon.fr/publication/2012ISAL0074/these.pdf, 2012.

Microsoft, "Pointer Ballistics for Windows XP," http://msdn.microsoft.com/en-us/windows/hardware/gg463319, Oct. 2002.

Mitra et al., "Gesture Recognition—A Survey," IEEE Transactions on Systems, Man, and Cybernetics, Part C: Applications and Reviews, vol. 37, Issue:3, pp. 311-324, May 2007.

Moiz et al., "A Comparative Study of Classification Methods for Gesture Recognition Using a 3-Axis Accelerometer" Neural Networks (IJCNN), The 2011 International Joint Conference on, pp. 2479-2486, Jul. 2011.

Molina et al., "A Flexible, Open, Multimodal System of Computer Control Based on Infrared Light," Int. J Latest Trends Computing, vol. 2 No. 4 Dec. 2011.

Moteki et al., "Poster—Head Gesture 3D Interface using a Head Mounted Camera," IEEE Symposium on 3D User Interfaces 2012, Mar. 4-5, 2012.

Murphy-Chutorian et al., "Head Pose Estimation in Computer Vision—A Survey," IEEE Transactions on Pattern Analysis and Machine Intelligence, vol. 31 Issue 4, pp. 607-626, Apr. 2009.

Na et al., "Design and Implementation of a Multimodal Input Device Using a Web Camera," ETRI Journal, vol. 30, No. 4, Aug. 2008, pp. 621-623.

Nabati et al., "Camera Mouse Implementation using 3D Head Pose Estimation by Monocular Video Camera and 2D to 3D Point and Line Correspondences," Telecommunications (IST), 2010 5th International Symposium on, pp. 825-830, Dec. 2010.

Nakashima, "Proposal of a Smile Sensor Using Light Reflected from a Cheek," IEEJ Transactions on Sensors and Micromachines, vol. 130, No. 1, p. 1, 2010.

Nasoz et al., "Maui Avatars—Mirroring the User's Sensed Emotion Via Expressive Multi-Ethnic Facial Avatars," Journal of Visual Languages & Computing, vol. 17, Issue 5, Oct. 2006.

Nawaz et al., "Infotainment Devices Control by Eye Gaze and Gesture," IEEE Transactions on Consumer Electronics, vol. 54 Issue 2, p. 277-282, May 2008.

Oskoei et al., "Application of Feature Tracking in Vision-based Human Machine Interface for Xbox," IEEE International Conference on Robotics and Biometrics (ROBIO), pp. 1738-1743, 2009.

Oviatt et al., "Multimodal Interfaces that process what comes naturally," Communications of the ACM Mar. 2000/vol. 43, No. 3, pp. 45-53, Mar. 2000.

Placetilli et al., "3D Point Cloud Sensors for Low-cost Medical In-situ Visualization," 2011 IEEE International Conference on Bioinformatics and Biomedicine Workshops, pp. 596-597, Nov. 2011.

Placitelli et al., "Low-Cost Augmented Reality Systems via 3D Point Cloud Sensors," 2011 Seventh International Conference on Signal-Image Technology and Internet-Based Systems (SITIS), pp. 188-192, Nov. 2011.

Rantanen et al., "A Wearable, Wireless Gaze tracker with Integrated Selection Command Source for HCI," IEEE Trans on Info Tech in Biomedicine, Sep. 2011.

Rantanen et al., "Capacitive Facial Activity Measurement," XX IMEKO World Congress Metrology for Green Growth, Sep. 9-14, 2012.

Rantanen et al., "Capacitive facial movement detection for Human Computer Interaction to click by frowning and lifting eyebrows," Med. Biol. Eng. Comput (2010), Dec. 2009.

Rantanen, "Effect of Clicking and Smiling on Accuracy of Head Mounted Gaz tracking," ETRA 2012, Santa Barbara, CA, Mar. 28-30, 2012.

Ratsch et al., "Wavelet Reduced Support Vector Regression for Efficient and Robust Head Pose Estimation," 2012 Ninth Conference on Computer and Robot Vision (CRV), pp. 260-267, May 2012.

Rautaray et al., "Design of Gesture Recognition System for Dynamic User Interface," Technology Enhanced Education (ICTEE), 2012 IEEE International Conference on, pp. 1-6, Jan. 2012.

Scheirer et al., "Expressions Glasses—A Wearable Device for Facial Expression Recognition," MIT Media Lab Perceptual Computing Section Technical Report No. 484—Submitted to CHI 99, May 1999.

Selker et al., "Eye-R, a Glasses-Mounted Eye Motion Detection Interface," CHI EA '01 CHI '01 Extended Abstracts on Human Factors in Computing Systems, pp. 179-180, 2001.

Shi et al., "GestureCam—A SMart Camera for Gesture Recognition and Gesture-Controlled Web Navigation," 9th International Conference on Control, Automation, Robotics and Vision, 2006.

Siemens AG, "IPCOM 000193567D—Facial Expression Reader for Program Hearing Aids," http://ip.com/IPCOM/000193567, Mar. 2010.

(56) References Cited

OTHER PUBLICATIONS

Stillitano et al., "Lip Contour Segmentation and Tracking Compliant with Lip Reading," Machine Vision and Applications, vol. 24, Issue 1, pp. 1-18, Jan. 2013.
Surakka et al., "Gazing and Frowning as a New Human-Computer Interaction Technique," ACM Transactions on Applied Perceptions, vol. 1, No. 1, pp. 40-56, Jul. 2004.
Tan et al., "Integrating Facial, Gesture and Posture Emotion Expression for 3D Virtual Agent," Proceedings of the 14th International Conference on Computer Games: AI, Animation, Mobile, Interactive Multimedia, Educational & Serious Games (CGames 2009 USA), pp. 23-31, 2009.
Tu et al., "Face as Mouse through Visual Face Tracking," Computer Vision and Image Understanding, vol. 108, Issues 1-2, Oct.-Nov. 2007, pp. 35-40, 2007.
Tuisku et al., "Gazing and Frowning to Computers Can Be Enjoyable," Proc. of 2011 Third International Conference on Knowledge and Systems Engineering, pp. 211-218, Oct. 2011.
Tuisku, "Wireless Face Interface—Using voluntary gaze and facial muscle activitations for human-computer interaction," Interacting with Computers 24(1): Jan. 1-9, 2012.
Vachetti et al., "Fusing Online and Offline Information for Stable 3D Tracking in Real-Time," Computer Vision and Pattern Recognition, 2003. Proceedings. 2003 IEEE Computer Society Conference on, II-241-8 vol. 2, Jun. 2003.
Valenti et al., "Facial Expression Recognition—A Fully Integrated Approach," Image Analysis and Processing Workshops, 2007. ICIAPW 2007. 14th International Conference on, pp. 125-130, Sep. 2007.
Valenti et al., "Webcam based Visual Gaze Detection," 15th International Conference Vietri sul Mare, Italy, Sep. 8-11, 2009 Proceedings, http://staffscience.uva.nl/~rvalenti/publications/ICIAP09.pdf, Sep. 2009.
Valstar et al., "The First Facial Expression Recognition and Analysis Challenge," IEEE International conference on Face and Gesture Recognition 2011, Mar. 25, 2011.
Verona et al., "Hands free vision based interface for Computer Accessibility," Journal of Network and Computer Applications, vol. 31 Issue 4, pp. 357-374, Nov. 2008.
Whitehill et al., "Developing a Practical Smile Detector," Submitted to PAMI (Pattern Analysis and Machine Intelligence, IEEE Transactions on), vol. 3, p. 5; http://mplab.ucsd.edu/~jake/pami_paper.pdf, 2007.
Whitehill et al., "Towards Practical Smile Detection," IEEE Trans Pattern Anal Mach Intell.; 31(11):2106-11, Nov. 2009.
Wu et al., "Vision based Gesture Recognition—A review," Lecture Notes in Computer Science, Gesture Workshop 1999; Springer, pp. 103-115, 1999.
Yang et al., "Gesture Recognition using Depth-based Hand Tracking for Contactless Controller Application," 2012 IEEE International Conference on Consumer Electronics (ICCE), pp. 297-298 , Jan. 2012.
Zhang et al., "A Framework for Hand Gesture Recognition Based on Accelerometer and EMG Sensors," IEEE Transactions on Systems, Man, and Cybernetics—Part A: Systems and Humans, vol. 41, No. 6, pp. 1064-1076, Nov. 2011.
Zhu et al., "Face Detection, Pose Estimation and Landmark Localization in the Wild," Computer Vision and Pattern Recognition (CVPR) Providence, Rhode Island, Jun. 2012.
Alcantara et al., "Learning Gestures for Interacting with Low-Fidelity Prototypes," 2012 First International Workshop on Realizing Artificial Intelligence Synergies in Software Engineering (RAISE), pp. 32-36, Jun. 2012.
Algorri et al., "Facial Gesture Recognition for Interactive Applications," Proceedings of the Fifth Mexican International Conference in Computer Science (ENC'04); 2004, IEEE.
An et al., "3D Head Tracking and Pose-Robust 2D Texture Map-Based Face Recognition using a Simple Ellipsoid Model," 2008 IEEE/RSJ International Conference on Intelligent Robots and Systems, pp. 307-312, Sep. 2008.
Ashdown et al., "Combining Head Tracking and Mouse Input for a GUI on Multiple Monitors," Proceedings—CHI EA '05 CHI '05 Extended Abstracts on Human Factors in Computing Systems, pp. 1188-1191, 2005.
Atienza et al., "Intuitive Interface through Active 3D Gaze Tracking," Proceedings of the 2005 International Conference on Active Media Technology (AMT 2005), pp. 16-21, 2005.
Bahr et al., "Non verbally Smart User Interfaces—Postural and Facial Expression data in Human Computer Interaction," Universal Access in Human-Computer Interaction—Ambient Interaction. Lecture Notes in Computer Science vol. 4555, pp. 740-749, 2007.
Berezniak, "These Expression Glasses Reveal How Deeply Awkward You Truly Are," http://gizmodo.com/5819127/these-expression+reading-glasses-reveal-how-deeply-awkward-you-truly-are, Jul. 2011.
Bettadapura, "Face Expression Recognition and Analysis—The State of the Art," Cornell University Library, Computer Science > Computer Vision and Pattern Recognition, Mar. 2012.
Blackburn, "Sam Blackburn—curriculum vitae," http://www.blackburns.org.uk/cv/, 2012.
Blonski, "The Use of Contextual Clues in Reducing False Positive in an Efficient Vision Based Head Gesture Recognition System—MS Thesis 2010," California Polytechnic State University, San Luis Obispo, http://digitalcommons.calpoly.edu/theses/295/, Jun. 2010.
Cai et al., "3D Deformable Face Tracking using Depth Camera," http://research.microsoft.com/en-us/um/people/zhang/papers/eccv2010-facetrackingwithdepthcamera.pdf. Communication and Collaboration Systems Group, Microsoft Research, One Microsoft Way, Redmond, WA 98052, 2010.
Cho et al., "A Method of Remote Control for Home Appliance Using Free Hand Gesture," 2012 IEEE International Conference on Consumer Electronics (ICCE), pp. 293-294, Jan. 2012.
Choi et al., "An Affective User Interface based on Facial Expression recognition and Eye gaze tracking," Affective Computing and Intelligent Interaction—Lecture Notes in Computer Science vol. 3784, 2005, pp. 907-914.
Cui et al., "Facial Feature Points Tracking Based on AAM with Optical Flow Constrained Initialization," Journal of Pattern Recognition Research 7 (2012) 72-79, Mar. 2012.
Dang et al., "A User Independent Sensor Gesture interface for embedded device," Proceedings of Sensors Conference, 2011 IEEE, pp. 1465-1468; Oct. 28-31, 2011.
De Silva et al., "Human Factors Evaluation of a Vision-Based Facial Gesture Interface," Proceedings of the 2003 Conference on Computer Vision and Pattern Recognition Workshop (CVPRW'03); IEEE, 2003.
Deniz et al. , "Smile Detection for User Interfaces," ISVC 2008, Part II, LNCS 5359, pp. 602-611, 2008.
Derry, "Evaluating Head Gestures for Panning 2-D Spatial Information—MS Thesis 2009," Masters Thesis, California Polytechnic State University, San Obispo, Dec. 2009.
Drewes, "Eye Gaze Tracking for Human Computer Interaction," Dissertation, LMU Munich: Faculty of Mathematics, Computer Science and Statistics, 2010.
Elmezain, "Gesture Recognition for Alphabets from Hand Trajectory using Hidden Markov Models," 2007 IEEE International Symposium on Signal Processing and Information Technology. pp. 1192-1197, Dec. 2007.
Eom et al., "Gyro Head Mouse for the Disabled—Click and Position Control of the Mouse Cursor," International Journal of Control, Automation, and Systems, vol. 5, No. 2, pp. 147-154, Apr. 2007.
Eveno et al., "Jumping Snakes and Parametric Model for Lip Segmentation," 2003 International Conference on Image Processing, 2003. ICIP 2003. Proceedings. II-867-70 vol. 3, Sep. 2003.
Eveno et al., "A New Color Transformation for Lips Segmentation," Multimedia Signal Processing, 2001 IEEE Fourth Workshop, pp. 3-8, 2001.
EyeTech Digital Systems, "Quick Glance—Software User's Manual Vol. 5.2," http://www.eyetechds.com, Apr. 2009.
EyeTech Digital Systems, "Quick Glance—Software User's Manual Vol. 6.4," http://www.eyetechds.com/wpcontent/uploads/2011/12/QG-6.4-Software-Users-Manual.pdf, Dec. 2011.

(56) References Cited

OTHER PUBLICATIONS

Foxlin et al., "WearTrack—A Self-Referenced Head and Hand Tracker for Wearable Computers and Portable VR," The Fourth International Symposium on Wearable Computers, pp. 155-162, Oct. 2000.
Fu et al., "hMouse—Head Tracking Driven Virtual Computer Mouse," IEEE Workshop on Applications of Computer Vision (WACV'07); 2007.
Gallo et al., "Controller-free exploration of medical image data—Experiencing the Kinect," Computer-Based Medical Systems (CBMS), 2011 24th International Symposium on, pp. 1-6, Jun. 2011.
Gast, "A Framework for Real-Time Face and Facial Feature Tracking using Optical Flow Pre-Estimation and Template Tracking," Master's Thesis, LIACS, Leiden University, Apr. 2010.
Gross et al., "Face Recognition across Pose and Illumination," Handbook of Face Recognition, Stan Z. Li and Anil K. Jain, ed., Springer-Verlag, Jun. 2004.
Hachisuka et al., "Drowsiness Detection using Facial Expression Features," SAE International, SAE paper 2010-01-0466, vol. 15, 2010.
Hromada et al., "Zygmotic Smile Detection—The semi-supervised haar training of a fast and frugal system," 2010 IEEE RIVF International Conference on Computing and Communication Technologies, Research, Innovation, and Vision for the Future (RIVF), pp. 1-5, Nov. 2010.
Huang et al., "Face Detection and Smile Detection," Proceedings of IPPR Conference on Computer Vision, Graphics and Image Processing, Shitou, Taiwan, A5-6, p. 108, 2009.
IBM, "User Interface—Face Document Navigation," http://researcher.watson.ibm.com/researcher/view_project_subpage.php?id=1987.
IBM, "User Interface—Facial Expressions," http://researcher.watson.ibm.com/researcher/view_project_subpage.php?id=1989.
IBM, "User Interface—Touchfree Switch," http://researcher.watson.ibm.com/researcher/view_project_subpage.php?id=1983.
Jain et al., "Wireless Accelerometer Based Mouse," http://coepetc.blogspot.com/, Jun. 2008.
Jeff Winder, "Face Gestures, FaceOSC and Flash," http://jeffwinder.blogspot.com/2011/07/face-gestures-faceosc-and-flash.html, Jul. 2011.
Jie Zhu, "Subpixel Eye Gaze tracking including Inner Eye Corner Detection," Fifth IEEE International Conference on Automatic Face and Gesture Recognition Proceedings, pp. 124-129, May 2002.
Keser et al., "Controlling Computer Mouse and Keyboard using a Head Mounted Accelerometer," Assistive Technologies Workshop ATW'11, Jun. 2011.
Kitazono et al., "Development of Non-Contact Type Chewing Sensor using Photo-Reflector," Applied Mechanics and Materials vol. 103, pp. 611-615 Sep. 27, 2011.
Kjeldsen, "Head Gestures for Computer Control," Proceedings of IEEE ICCV Workshop on Recognition, Analysis, and Tracking of Faces and Gestures in Real-Time Systems, pp. 61-67; 2001.
Kjeldsen, "Improvements in Vision Based Pointer Control," Proceedings of ASSETS'06, Oct. 22-25, 2006, pp. 189-196; ACM, 2006.
Kwan et al., "Click Control—Improving Mouse Interaction for People with Motor Impairments," ASSETS'11, Oct. 24-26, 2011.
Lance et al., "Brain-Computer Interface Technologies in the Coming Decades," Proceedings of the IEEE, vol. 100, Special Centennial Issue, pp. 1585-1599, May 2012.
LeBlanc et al., "Computer Interface by Gesture and Voice for Users with Special Needs," Conference Publication—Innovations in Information Technology Conference, Nov. 2006.
Lee et al., "Beyond Mouse and Keyboard—Expanding Design Considerations for Information Visualization Interactions," IEEE Trans. on Visualization and Computer Graphics; vol. 18, Issue: 12, pp. 2689-2698; Dec. 2012.
Liu et al., "3D Head Pose Estimation based on Scene Flow and Generic Head Model," 2012 IEEE International Conference on Multimedia and Expo (ICME), pp. 794-799, Jul. 2012.
Maat et al., "Gaze-x—Adaptive, Affective, Multimodal Interface for Single-User Office Scenarios," Proceeding—ICMI '06 Proceedings of the 8th international conference on Multimodal interfaces, pp. 171-178, 2006.
Manchanda et al., "Advanced Mouse Pointer Control Using Trajectory Based Gesture Recognition," IEEE SoutheastCon 2010, Proceedings of the, pp. 412-415, Mar. 2010.
Kyle McDonald, "FaceOSC on Vimeo," http://vimeo.com/26098366, Jul. 2011.
Pedro Martins, "Youtube—Head Tracking as a Computer Mouse," http://www.youtube.com/watch?v=r8KL6YqWy6s&list=UUSrHYe81P6cQcagP32C1cjA&index=9, Jan. 2011.
Szymon Deja, "Youtube—Head Mouse.avi," http://www.youtube.com/watch?v=uq3jnyTTfls, Dec. 2009.
Torben Sko, "Youtube—Using Head Gestures in PC Games," http://www.youtube.com/watch?v=qWkpdtFZoBE, Aug. 2008.
Kapoor et al., "A Real-Time Head Nod and Shake Detector", Proceeding from the Workshop on Perceptive User Interfaces, Nov. 2001, 5 pages.
Gruebler et al., "A Wearable Interface for Reading Facial Expressions Based on Bioelectrical Signals", International Conference on Kansei Engineering and Emotion Research, Mar. 2-4, 2010, 10 pages.
Skovsgaard et al., "Computer Control by Gaze", Chapter 9 of Book "Gaze Interaction and Applications of Eye Tracking", Medical Information Science Reference, Hershey, PA, USA, 2012, 25 pages.
Wilson et al., "FlowMouse—A Computer Vision-Based Pointing and Gesture Input Device", Proceedings of IFIP International Conference on Human-Computer Interaction (Rome, Italy, Sep. 12-16, 2005). Interact 2005. Springer, Berlin, 14 pages.
Ellis et al., "Hands-off Cursor Control", http://dip.sun.ac.za/~herbst/cursor_control.html, Feb. 24, 2011, 2 pages.
Morency et al., "Head Gesture Recognition in Intelligent Interfaces: The Role of Context in Improving Recognition", IUI'06, Jan. 29-Feb. 1, 2006, Sydney, Australia, 7 pages.
Kerns, "Hands-Free Mouse, Use your head instead of your hands!", http://makezine.com/projects/hands-free-mouse/, http://makezine.com/projects/hands-free-mouse/, Dec. 2012, 9 pages.
Bi, "Minnesota college student invents hands-free mouse", http://www.mprnews.org/story/2010/09/19/student-invention, The Minnesota Daily, Sep. 19, 2010, 5 pages.
Deniz, "Mirroring facial expressions in Virtual Humans—Empathic Avatars", http://web.archive.org/web/20120629045337/http://www.evil.eu/evilsolutions/empathicavatars.html, Jun. 29, 2012, 5 pages.
Morency et al., "The Role of Context in Head Gesture Recognition (Morency)", Artificial Intelligence vol. 171, Issues 8-9, Jun. 2007, 4 pages.
Lart Larry, "uMouse (versions 1.1)", http://web.archive.org/web/20120105050319/http://larryo.org/work/information/umouse/, http://larryo.org/work/information/umouse/, Jan. 2012, 8 pages.
Francone et al., "Using the User's Point of View for Interaction on Mobile Devices", Conference Proceedings of IHM'11, the 23th ACM International Conference of the Association Francophone d'Interaction Homme-Machine, ACM New York, NY, USA, (Nice, Oct. 2011), 9 pages.
Chen et al., "Human-Computer Interaction for Smart Environment Applications Using Hand-Gestures and Facial Expressions", http://www.site.uottawa.ca/~petriu/IJMAC-HandGestureFaceExpression.pdf, International Journal of Advanced Media and Communication, vol. 3 Issue 1/2, Jun. 2009, 21 pages.
Hamedi, et.al., "Human facial neural activities and gesture recognition for machine-interfacing applications", Int J Nanomedicine, 2011, 6:3461-3472, Published online Dec. 16, 2011, 16 pages.
Rozado, "Real Time Gaze Gesture Recognition System from Universidad Autonóma de Madrid", http://youtu.be/uPLtNpONjHw, Computational Neuroscience Group (GNB) at Universidad Autónoma de Madrid (UAM), YouTube, uploaded on Jul 8, 2011.
Rozado, "Remote Gaze Gestures", http://youtu.be/BaZx2aKoxDl, Computational Neuroscience Group (GNB) at Universidad Autónoma de Madrid (UAM), YouTube, uploaded on Nov. 29, 2011.

* cited by examiner

| Parameter Id | Name of Parameter | Value Assigned (in one embodiment) |
|---|---|---|
| P#1 | SENSOR_READING_TIME_INT | 25 ms |
| P#2 | DELAY_TO_NEXT_ITERATION | 10 ms |
| P#3 | TIME_TO_HOLD_PCE_BEFORE_MOVEMENT | 300 ms |
| P#4 | MIN_PCE_DURATION_FOR_CLICK | 75 ms |
| P#5 | MAX_PCE_DURATION_FOR_CLICK | 300 ms |
| P#6 | MOTION_NOISE_TH | 1 deg/s |
| P#7 | MOTION_TH_AT_P3 | 2 deg/s |
| P#8 | DROWSE_EYE_CLOSE_TIME_TH | 1500 ms |
| P#9 | PCE_FALLING_TOO_FAST_TH | 15 |
| P#10 | PCE_RISING_AGAIN_TH | 3 |
| P#11 | PCE_EXPRN_TH_CALC_PERCENT | 25% |
| P#12 | PCE_EXPRN_TH_CALC_DIFF | 250 |

Fig. 19

Fig. 25
| Velocity | Gain | Output |
|---|---|---|
| 0 | 0.00 | 0 |
| 1 | 1.00 | 1 |
| 2 | 0.50 | 1 |
| 3 | 0.33 | 1 |
| 4 | 0.25 | 1 |
| 5 | 0.25 | 1.25 |
| 6 | 0.25 | 1.5 |
| 7 | 0.25 | 1.75 |
| 8 | 0.25 | 2 |
| 9 | 0.33 | 3 |
| 10 | 0.40 | 4 |
| 11 | 0.45 | 5 |
| 12 | 0.50 | 6 |
| 13 | 0.54 | 7 |
| 14 | 0.57 | 8 |
| 15 | 0.60 | 9 |
| 16 | 0.63 | 10 |
| 17 | 0.65 | 11 |
| 18 | 0.67 | 12 |
| 19 | 0.68 | 13 |
| 20 | 0.70 | 14 |
| 21 | 0.71 | 15 |
| 22 | 0.73 | 16 |
| 23 | 0.74 | 17 |
| 24 | 0.75 | 18 |
| 25 | 0.76 | 19 |
| 26 | 0.77 | 20 |
| 27 | 0.78 | 21 |
| 28 | 0.79 | 22 |
| 29 | 0.79 | 23 |
| 30 | 0.80 | 24 |
| 31 | 0.77 | 24 |
| 32 | 0.75 | 24 |
| 33 | 0.73 | 24 |
| 34 | 0.71 | 24 |
| 35 | 0.69 | 24 |
| 36 | 0.67 | 24 |
| 37 | 0.65 | 24 |
| 38 | 0.63 | 24 |
| 39 | 0.62 | 24 |
| 40 | 0.60 | 24 |
| 41 | 0.59 | 24 |
| 42 | 0.57 | 24 |
| 43 | 0.56 | 24 |
| 44 | 0.55 | 24 |
Fig. 26
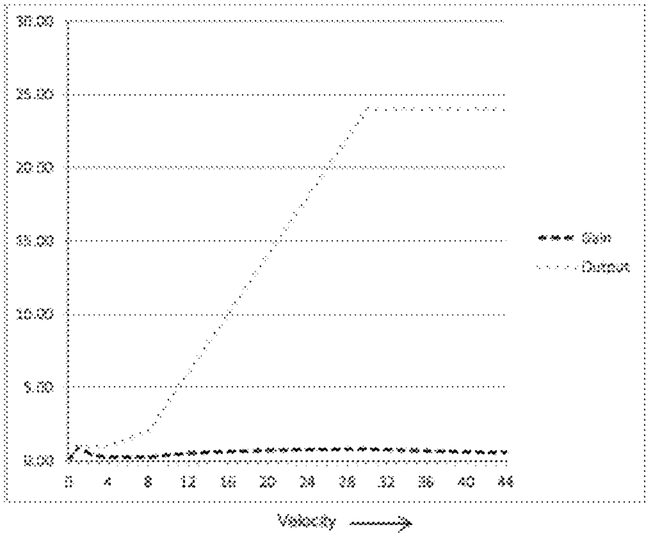
Fig. 27
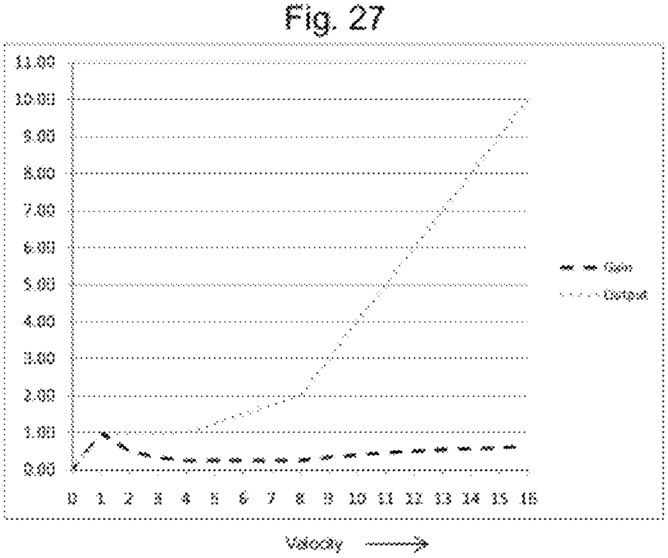

MULTIPURPOSE CONTROLLER FOR ELECTRONIC DEVICES, FACIAL EXPRESSIONS MANAGEMENT AND DROWSINESS DETECTION

This application claims priority to U.S. Provisional Patent Application Ser. No. 61/452,086, filed Mar. 12, 2011 entitled "A Multipurpose Device for Computer Pointer Control, Facial Expression Management and Drowsiness Detection;" U.S. Provisional Patent Application Ser. No. 61/552,124 filed on Oct. 27, 2011 entitled "Multi-purpose Device for Computer Pointer Control, Facial Expressions Management and Drowsiness Detection;" and U.S. Provisional Patent Application Ser. No. 61/603,947 filed on Feb. 28, 2012 entitled "Multipurpose Controller for Computer Pointer Control, Facial Expression Management and Drowsiness Detection" the disclosures of which are expressly incorporated herein by reference.

BACKGROUND

The present application relates to controlling electronic devices without the use of hands. Efforts have been made for more than twenty-five years to eliminate the need to use hands, especially when it comes to controlling the pointer/cursor on a computer screen. However, this has met with limited success due to a combination of multiple factors such as limitations on functionality provided (such as lack of hands-free or legs-free selection/clicking), complexity and cumbersomeness of use of the device, lack of accuracy and precision, lack of speed, lack of portability, lack of flexibility, and high cost of manufacturing. As a result, there are no competitively priced hands-free computer mouse replacement products available for use by general masses that are enjoying wide commercial success. There are also no portable and competitively priced products available for facial expressions management.

SUMMARY

The controller described herein can provide hands-free control of electronic devices by being worn on the user's head, face or body, and being commanded using motions of user's head, face or body including facial expressions. Embodiments of the controller can also be used for drowsiness detection as well as for detecting, storing, communicating and utilizing information pertaining to facial expressions and body motions of the user.

Facial expression detection can be performed without requiring or necessitating the use of cameras or biometric sensors. Sensors such as proximity, touch and mechanical sensors can be used, thereby allowing simplicity of the controller, small size, ease of use, flexibility in location and manner of use, portability, predictability, reduction in complexity of software used to drive the controller and overall cost reduction in manufacturing the controller.

The methods of interacting with the controller disclosed herein can provide ease of use as well as the ability to use the controller in public places in an inconspicuous fashion. In addition, use of facial expressions such as a smile or raising the eyebrows can provide potential health benefits to the user. These methods can also allow for speed, accuracy and precision of control as well as predictability. Further, these methods along with the approach of using angular velocity readings from inertial sensors without numerical integration techniques, allow for simpler and faster software algorithms while circumventing issues with numerical integration. This adds to accuracy and precision of the controller while reducing the overall cost.

The controller can be used to control various electronic devices, including but not limited to computers (desktop, laptop, tablet and others), mobile phones, video game systems, home-theater systems, industrial machinery, medical equipment, household appliances, and light fixtures, in a hands-free fashion. The controller functionality can also be incorporated into devices that do not traditionally include a controller capability. This allows for the creation of controller embodiments focused on specific functions such as facial expression management, drowsiness detection, video game controller, computer control, or others specific functions, or other controller embodiments can provide a variety of combinations of functions by themselves or in conjunction with other devices. As an illustrative example, a controller can function as a wireless phone head set that can also be used as a computer mouse or a pointer controller. The same controller can also function as a drowsiness alert/alarm system to be used while driving a vehicle, as a remote control to turn on the lights, operate the home theater system and play videogames. It can also inform the user how many steps they walked during the day and how many times they smiled or frowned while using the controller. By virtue of being able to fulfill multiple functions, the controller can provide user convenience by alleviating the need to carry multiple controllers. It can provide overall reduction in cost as well as a marketing advantage over other limited function controllers.

A hands-free method of controlling an electronic device by a user is disclosed that includes monitoring facial expressions of the user, monitoring motions of the user's body, generating commands for the electronic device based on the monitored facial expressions of the user and the monitored motions of user's body, and communicating the commands to the electronic device. Monitoring facial expressions of the user can include sensing motions of facial muscles of the user using a facial expression sensor. The facial expression sensor can be a proximity sensor, a touch sensor, a mechanical sensor (e.g., a mechanical switch, flex sensor, piezoelectric membrane or strain gauge), a biometric sensor (e.g., an EMG or EOG sensor), or an image processing system. Monitoring facial expressions of the user can include sensing touch of facial sensors by facial muscles of the user, where the facial sensors can be proximity, touch or mechanical sensors.

Generating commands for the electronic device can include receiving sensor readings from a facial expression sensor monitoring facial expressions of the user, determining an expression baseline value for the facial expression sensor, determining an expression threshold value for the facial expression sensor, ignoring readings from the facial expression sensor below the expression baseline value, and detecting an active facial expression when readings from the facial expression sensor cross the expression threshold value. Generating commands for the electronic device can include receiving sensor readings from a motion sensor monitoring motions of the user's body, determining a motion baseline value for the motion sensor, determining a motion threshold value for the motion sensor, ignoring readings from the motion sensor below the motion baseline value, and detecting motion when readings from the motion sensor exceed the motion threshold value.

Monitoring motions of the user's body can include sensing motions of the user's head. Motion of user's head can be sensed using inertial sensors or an image processing system.

Generating commands for the electronic device can include generating selection commands based on a combination of monitored facial expressions and monitored motions of the user's body during the monitored facial expressions. Generating commands for the electronic device can include receiving sensor readings from a facial expression sensor monitoring facial expressions of the user, receiving sensor readings from a motion sensor monitoring motions of the user's body, determining an expression threshold value for the facial expression sensor, detecting an active facial expression when readings from the facial expression sensor cross the expression threshold value, determining a motion baseline value for the motion sensor, determining a motion threshold value for the motion sensor, ignoring readings from the motion sensor below the motion baseline value, and generating a selection command for an object on the electronic device when the active facial expression is detected for more than a minimum selection hold time and less than a maximum selection hold time, and the motion sensor readings are below the motion threshold value for the minimum selection hold time. Generating commands for the electronic device can include generating a click and drag command for the object on the electronic device when the active facial expression is detected for more than the maximum selection hold time and the motion sensor readings are above the motion baseline value, and dragging the object based on the motion sensor readings while the active facial expression is detected. Generating commands for the electronic device can include generating a click and drag command for the object on the electronic device when the active facial expression is detected for more than the maximum selection hold time and the motion sensor readings are above the motion baseline value, and dragging the object based on the motion sensor readings while the facial expression sensor readings are above an expression maintain threshold, the expression maintain threshold being less than the expression threshold value.

A method of facial expressions management is disclosed that includes monitoring facial expressions of the user. Monitoring facial expressions of the user can include sensing motions of facial muscles of the user using a facial expression sensor. Monitoring facial expressions of the user can include determining a baseline value for the facial expression sensor, and ignoring readings from the facial expression sensor below the baseline value. Monitoring facial expressions of the user can include determining a threshold value for the facial expression sensor, and detecting an active facial expression when readings from the facial expression sensor cross the threshold value. A device worn on the user's head can be used to monitor facial expressions of the user. The device worn on the user's head can have an eyewear structure, or a headphone structure.

The facial expressions management method can also include monitoring body motions of the user, which can include monitoring head motions of the user which can be done using inertial sensor. The facial expressions management method can also include storing monitored facial expressions of the user, and communicating monitored facial expressions of the user to an electronic device.

A drowsiness detection method for detecting drowsiness of a useris disclosed that includes monitoring eye opening of the user using a monitoring device, generating an alert when drowsiness is detected based on the monitored eye opening, monitoring proper usage of the monitoring device, and generating a warning when improper usage of the monitoring device is detected. The monitoring device can sense reflected light to monitor eye opening of the user. Monitoring eye opening of the user can include transmitting a beam of light from a source to a sensor, and monitoring obstruction of the transmitted beam. The monitoring device can sense change in electric fields to monitor eye opening of the user. The change in electric fields can be sensed using electric field sensors, or capacitive sensors. Proper usage of the monitoring device can be monitored using a proximity sensor or a touch sensor.

BRIEF DESCRIPTION OF THE DRAWINGS

FIG. 19 shows some exemplary controller parameters that can be used used in heuristics;

FIG. 25 shows exemplary values for a gain factor curve;

FIG. 26 shows a graph of the exemplary gain factor curve values of FIG. 25; and FIG. 27 shows an expanded view of the initial region of the graph of the exemplary gain factor curve values of FIG. 25.

DETAILED DESCRIPTION

Figure 1:
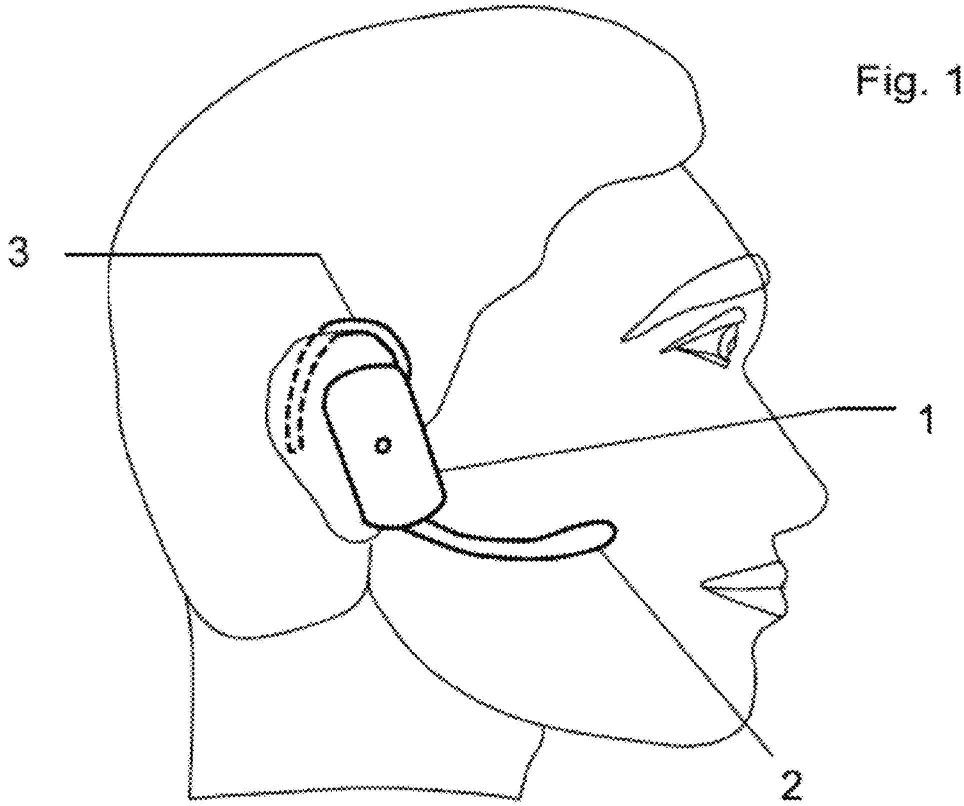
FIG. 1 shows a user wearing a n exemplary embodiment of a controller.

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A multi-purpose controller (henceforth simply called "controller") and a method for using the controller are disclosed. The controller can be used for many different purposes as will become evident from the disclosure.

Controller embodiments can be used for hands-free control of electronic devices: The term "electronic device" is used to designate any devices that have a microprocessor and that need controlling. This includes, but is not limited to computers (desktop, laptop, tablet and others), mobile phones, video game systems, home-theater systems, industrial machinery, medical equipment, household appliances as well as light fixtures. The controller can be used for control of the position of a cursor or pointer or graphical object on the display of controlled electronic devices, and/or for selection and manipulation of graphical objects and invocation of commands. Facial expressions and motions of the head can be used to achieve this hands-free control. Some examples of facial expressions that can be used are a smile, frown, eyebrow raises (one eyebrow at a time or together), furrowing the brow, teeth clenches, teeth chatter, lower jaw drops, moving lower jaw side to side, opening or closing of the mouth, puffing the cheeks, pouting, winking, blinking, closing of eyes, ear wiggles, nose wiggles, nose twitches and other expressions, as well as motions of the entire head/face such as nodding, shaking, rolling, tilting, rotating the entire head, etc.

Some electronic devices such as household appliances may not necessarily include the concept of a pointer or a cursor, or even a traditional display screen such as a computer display screen. However, these devices still have input/output mechanisms such as dials, buttons, knobs, etc. that can be selected or unselected and even manipulated (for example set, reset, scrolled, turned up or down and other actions), all of which can be controlled based on motions of the head, body and face, including facial expressions. Thus, embodiments of the controller can be used as a replacement for a computer mouse, as well as for remotely controlling other electronic devices in a hands-free fashion.

Controller embodiments can be used for facial expressions management which includes sensing/detecting facial expressions of a user, such as smiles, head-nods, head-shakes, eye-blinks/closes/winks, etc., storing, analyzing and communicating this information, as well as for providing feedback either during or after usage of the controller. This information could be used for the personal benefit of the user, or for business interests in a business environment (for example, to encourage call center associates to smile before and during customer calls, or to capture the facial expression and motion information for analysis at a later time). The gathered facial expression and head motion information can be stored on the controller, the controlled device or another device. This facial expressions management information can be processed and retrieved later for a variety of business or personal uses.

Controller embodiments can be used as a drowsiness detection and alarm system. By monitoring blinking and closure of the user's eyes, along with motions of the head, the controller can work as a drowsiness detection system. The controller can also alert the user when such conditions are detected to help wake them up and keep them awake, as well as possibly send messages to other devices or people, including initiating phone calls.

Controller embodiments can aid in the ease of use of augmented reality devices: A head mounted controller can be used to provide heading and possibly even GPS information to an augmented reality device without having to pull out the augmented reality device from wherever it is stored and pointing it in the direction of interest.

Controller embodiments can be used for sports management functions, for example as pedometers or physical activity monitors. The controller can also interface with other devices and sensors to share, acquire, analyze and process such information.

FIG. 1 illustrates an exemplary controller 100 that looks similar to a wireless headset for a phone or a multimedia player, wherein the controller 100 is mounted on a user's head and therefore hands-free. The controller 100, when being used to control a pointer/cursor/graphical object on an electronic device, can provide ease of use and flexibility in communication with the electronic device, such as a computer, a video game console, etc. This is due in part because controlling of the pointer/cursor requires no hands to move the controller 100 or to perform a "click" with the controller 100. The controller 100 can provide a more efficient, less distracting, way of working because the gaze of the user does not have to be broken to locate a computer mouse for object selection, cursor movement or other purpose. The user's gaze also does not have to be broken to again locate the keyboard/keys on the keyboard after use of the computer mouse. The controller 100 enables clicking on a button or selection of a user interface element on an electronic device display in a hands-free as well as feet/legs-free mode, thereby causing further ease of use. Usage of facial expressions such as smiles in operation of the controller 100 can also potentially impart beneficial effects on the mental state of the user.

The controller 100, when used to control household, industrial and medical electronic devices can enable hands-free, remote control of the devices. At home, the controller 100 could control various devices, for example a washing machine, home-theater equipment or a light fixture to name but a few. The controller 100 can be useful in medical situations where a surgeon or dentist can personally control ultrasound machines, dental equipment, and other devices during a medical procedure without having to touch anything that may not be sterile or having to explain to someone else what needs to be done with the equipment. When being used as a controller to monitor/capture facial expressions, the controller 100 can provide ease of use and flexibility due to easy head-mounted use without any video cameras to capture facial expressions. Users can move freely and are not required to be in front of cameras or their computer. The controller 100 can be less expensive to manufacture since it does not need to have cameras pointed at user's face. Cameras can be much more costly than simple touch and infrared sensors used in the embodiment of controller 100. In addition, the microprocessor does not have to be as powerful to process video images, thereby providing further cost savings. The controller 100 can also be easy to use in marketing applications to gauge the response of users to an advertisement, or to measure/monitor facial expressions of an audience during a movie, play or even at a sports event, where the users can freely move around.

When used in Augmented Reality applications, the controller 100 can also provide the ease of use of hands-free operation. The controller 100 can be worn on the head and be ready for immediate use since it will already be pointing in the direction where the user's head is pointing. In contrast, in order to use a GPS based controller (including a GPS based mobile phone), the GPS-based controller has to first be retrieved from a purse or a pocket or from wherever it is stored, and then it has to be pointed in the direction of interest to receive the augmented reality information. The inclusion of sensors such as a compass and GPS sensors in the controller

100 can create an opportunity to correlate heading, location and head orientation information with facial expressions that can be tied to emotional measurement (which can be useful for a variety of individual and corporate applications).

The controller 100 can also be used as a drowsiness detection device. When used as a drowsiness-detection device, the controller 100 can provide cost reductions by replacing expensive components such as a camera with infrared detection or proximity sensors which are less expensive and much simpler to operate/monitor. Image processing of videos in real time also needs a lot more computational power. Not having to do video processing thereby also alleviates the need for bigger, more expensive and more power demanding microprocessors. The ability to embed the controller 100 into an existing device such as a phone headset, can also provide further cost savings as well as convenience.

The components of an embodiment of the controller depend on the application/purpose of the controller embodiment as well as the preference of the manufacturer or the user. Note that the controller does not need to exist independently, that is, it can also be embedded into another device, thereby not needing its own separate housing or a separate communication link to the controlled electronic devices or a separate power source. The following components provide examples of some of the components that can be included in various combinations in different embodiments of a controller.

A controller typically includes one or more microprocessor which is an integrated circuit containing a processor core, memory, and programmable input/output peripherals. The microprocessor is typically the brain of the controller that connects with the sensors, adjustment controls, audio/video input/output devices, processes the sensor readings, and communicates information and commands to the controlled electronic devices as well as other output devices. The microprocessor memory can store the control software and other software and information necessary for functioning of the controller. The control software can run on the microprocessor and provide the logic/intelligence to process the sensor inputs, process information from various controls, communicate with the controlled electronic devices, communicate with output components, etc.

Some of the functionality of the control software running on the microprocessor(s), especially related to processing of sensor outputs, can also be embedded inside the sensors themselves. Some controller embodiments may also have logic related to translating the motion signals into actual motion commands as well as other logic moved to the hardware used for the communication link (described below) or even the controlled electronic device itself.

The controller can include power source(s) to provide power for running the microprocessor(s) as well as various sensors and audio/video input/output devices and other elements of the controller. Multiple power sources could be used by the controller.

The controller can include different kinds of sensors depending on the application or purpose intended for the controller. Some exemplary sensors that could be used in different embodiments of a controller are inertial sensors, heading sensors, location sensors, facial expression (FE) sensors, and other types of sensors. Inertial sensors include accelerometers, gyroscopes, tilt sensors as well as any other inertial sensors and/or their combinations. Inertial sensors provide information about the motion experienced to the microprocessor. Any or all of the inertial sensors can be MEMS (micro electro-mechanical system) or iMEMS (integrated micro electro-mechanical system) based. The gyroscopes can be based on Coriolis-effect (using MEMS/iMEMS technology or otherwise). The accelerometers can be one-axis, two-axis or three-axis accelerometers. Similarly, the gyroscopes can be one-axis, two-axis or three-axis gyroscopes. The accelerometers and gyroscopes can be combined together in one or multiple components. Heading sensors can include compass based sensors, for example magnetometers, and are preferably compensated for tilt. Heading sensors provide heading information to the microprocessor. Location sensors can include GPS components. Location sensors provide information about the location of the user to the microprocessor.

Facial expression sensors provide information on expressions on the face of the user via different kinds of sensors. Facial expression sensors can be mounted on sensor arms, eye wear, head wear or various other support structures that can be used to monitor changes in different parts of the face or mounted (stuck) directly to the user's face itself. Some examples of facial expression sensors are proximity sensors (including but not limited to capacitive, resistive, electric field, inductive, hall effect, reed, eddy current, magneto resistive, photo-reflective, optical shadow, optical IR, optical color recognition, ultrasonic, acoustic emission, radar, sonar, conductive or resistive, etc.), touch sensors, flex sensors, strain gages/sensors, etc. The facial expression sensors can be connected to the microprocessor via wires or wirelessly. The facial expression sensors can be connected to a separate power source than the one powering the microprocessor. If the facial expression sensors are RFID based, they may not even need a power source. Mechanical switches and levers with spring action can also be used as facial expression sensors to measure motion of facial muscles.

The controller can include sensor arms to provide a location to mount sensors, audio mikes and other controller components. Sensor arms can be connected to the main housing of the controller. Sensor arms can be made flexible, twistable and/or bendable so that the sensors (mounted on the arm) can be placed over the desired location on the face, as well as in the desired orientation. Sensor arms can also be connected to each other. Sensor arms are optional, as some controller embodiments may not require them to mount the sensors. For example, sensors could be directly mounted on head gear or eye wear or any other device or structure the user may be wearing.

The controller can include sensor mounts to provide spaces to mount sensors. Sensor mounts can be mounted on sensors arms or independently on any head gear or other structures being worn by the user. For example, a sensor mount can be clipped onto the eye glasses or a cap being worn by the user. Sensor mounts are optional as sensors can be directly attached to sensor arms or any other support structures or even be embedded inside them. As an example, the sensing electrode of a capacitive touch sensor could be painted in the form of a conductive paint on part of the sensor arm or be embedded inside eyewear to sense touch and proximity of facial muscles to the area that contains the electrode.

The controller can include a housing that provides a physical enclosure that contains one or more components of the controller. For example, a controller embodiment can include a housing that holds the microprocessor, power source (battery—regular or rechargeable), part of a communication link, certain sensors (such as inertial, location and heading sensors, etc.), and the housing can also provide a structure to attach various extensions such as sensor arms, etc. The housing can also provide a structure for mounting various controls and displays. Some controller embodiments, for example an embedded embodiment (see FIGS. 3 and 4), do not need their own housing since the controller components reside in the housing of a headphone or other device that supplies the enclosure.

The controller can include housing mounts that help the user to wear the controller on his/her head or face. A housing mount can be in the form of a mounting post in combination with an ear clip and/or an ear plug, all connected together. The ear clip can hang the housing by the user's ear and the ear plug can provide further securing of the housing in relation to the head. It may not be necessary to have both an ear plug and an ear clip; as one of them may be sufficient to secure the controller against the user's head. Alternatively, the housing mount can be a head band/head gear that holds the housing securely against the user's head. The housing mount is also optional given that different embodiments of a controller can leverage parts of another device. The controller can also perform if not mounted on the head. For example, the controller can be moved around using any part of the body, or the controller can be left in the user's pocket and be configured to provide some functions as the user moves his/her entire body.

The controller can include controls which include, for example, power switches, audio volume controls, sensor sensitivity controls, initialization/calibration switches, selection switches, touch based controls, etc. The controller can include output components that can range from display screens (possibly including touch abilities) to multi-colored LED light(s), infrared LEDs to transmit signals to audio speaker(s), audio output components (possibly contained in the ear plug), haptic feedback components, olfactory generators, etc. The controls and output components are also optional. Some controller embodiments can also leverage controls and output components of the controlled electronic device and/or the device that the controller is embedded in.

The controller can include additional input components which can include, for example, audio mikes (possibly used in conjunction with voice recognition software), sip-and-puff controls, a joystick controllable by mouth or tongue, pressure sensors to detect bite by the user, etc. These additional input components are also optional components that can be provided based on the functionality desired.

The controller can include interface ports which can include, for example, power ports, USB ports, and any other ports for connecting input or output components, audio/video components/devices as well as sensor inputs and inputs from other input components. For example, an interface port can be used to connect to sensors which are not provided as part of the controller, but whose input can still be used by the controller. Interface ports are also optional components.

The controller can include communication links that provide wired or wireless connection from the microprocessor to the controlled electronic device(s) (such as a computer, video game console, entertainment system, mobile phone, home appliance, medical equipment, etc). The communication link can include a wireless transmitter and/or receiver that uses Bluetooth, radio, infrared connections, Wi-Fi, Wi-Max, or any other wireless protocol. If the controller is embedded in another electronic device then the controller can leverage communication link(s) already present in that device.

As stated above, the list of components in a specific controller embodiment depend on the functionality desired in that embodiment of the controller, and if that embodiment embeds the controller components and functionality into another device. In the latter case, the components that are common between the controller and the other device are shared. For example, if the controller is incorporated in a wireless phone head set, then the controller can use the audio mike, audio speaker, power source, power control, volume control, housing as well as possibly the communication link already present in the phone head set.

Some exemplary controller embodiments are described below which include a certain suite of controller components. Given the multitude of component options available, there can easily be dozens if not hundreds of unique combination of components to form a desired controller embodiment and therefore it is not practical to list and describe all possible embodiments.

Figure 2:
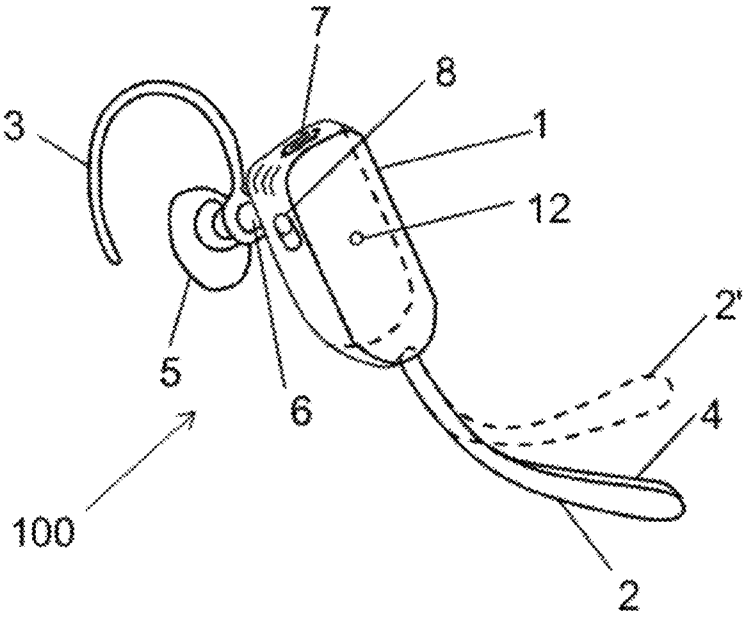
FIG. 2 shows a perspective view of the controller of FIG. 1.
Figure 17:
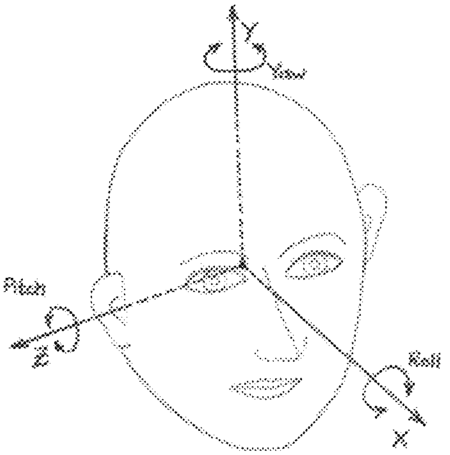
FIG. 17 shows an exemplary head coordinate system that can be used by a controller.

FIGS. 1 and 2 illustrate an exemplary embodiment of a controller 100 that exists independently, can be used as a hands free computer mouse, and can be used for facial expressions management. FIG. 1 depicts a user wearing the controller 100 and FIG. 2 shows a perspective view of the controller 100. The controller 100 includes a housing 1, a sensor arm 2, an ear clip 3, an ear plug 5, mounting post 6, a USB port 7, a power switch 8 and a status indicator 12. The housing 1 holds a microprocessor, power source, inertial sensors (including at least a two axis gyroscope or equivalent, and up to a 3-axis gyroscope and an optional 3-axis accelerometer), an optional orientation sensor (a tilt-compensated compass unit) as well as a radio frequency (RF) transmitter that connects the controller 100 to an electronic device (a computer in this case). The gyroscopes and accelerometers can be positioned so that at least one of their axes is reasonably aligned with the direction of the line segment that joins the midpoint of the two ears of the user, and at least one other axis, perpendicular to the first axis, is aligned substantially along the direction of the user's neck/backbone (when the user is sitting, standing or lying down normally). The first axis can be used to measure angular motions in the pitch direction and the second axis can be used to measure angular motions in the yaw direction. See FIG. 17 for a pictorial depiction of an exemplary head coordinate system comprising a pitch axis, a yaw axis and a roll axis. Optionally, a third gyroscope can be provided to measure the angular motions in the roll direction.

The USB Port 7 can be coupled to the rechargeable battery inside the housing 1 and thereby be used for recharging the battery. The USB port 7 can also be coupled to the microprocessor and be used as an alternate communication link. Alternatively, the USB wired connection could be the main communication link and a RF connection could be an alternative link. Although FIG. 2 shows the USB port 7 at the top of the housing 1, it can be located at the bottom or sides of the housing 1 to make it more convenient to plug in a USB cable to connect it to the controlled electronic device while being worn.

The flexible/bendable sensor arm 2 is connected to the housing 1 of the controller 100. The underside 4 of the sensor arm 2 is shown with a reflective proximity sensor mounted near the tip of the arm 2. The sensor arm 2' (FIG. 2) is just another configuration of the sensor arm 2 shown in an adjusted state to suit the user's face. In an alternate embodiment, the reflective proximity sensor on the underside 4 of the arm 2 could be substituted by or complemented by a touch sensor such as a capacitive touch sensor which can also provide proximity information along with the touch status. In a controller embodiment where a capacitive touch sensor is used, the tip of the sensor arm 2 can be provided with a conductive area or surface that is electrically connected to the controller of the capacitive touch sensor (which resides in the housing 1). This conductive area could be simply a small piece of copper plate or copper wire. In another embodiment, a mechanical action button/switch can be used instead of a touch sensor to detect motion of the facial muscles; and the mechanical action switch could also detect the amount of muscle movement. Alternatively, the sensor arm 2 could be pressing against the facial muscles through spring action and then as the facial muscles move, the sensor arm 2 could measure the deflection in the arm 2 that results from the facial muscle movement.

From the back side of the housing 1 of controller 100 protrudes the mounting post 6 which is coupled to the ear plug 5 which helps hold the controller 100 in place when the user is wearing it by means of the ear clip 3. While the ear clip 3 provides additional means of securing the controller 100 around the user's ear, the ear clip 3 can be removable and optional. An optional audio output component or haptic feedback component could be embedded inside the ear plug 5 or the housing 1 of the controller 100.

Figure 5:
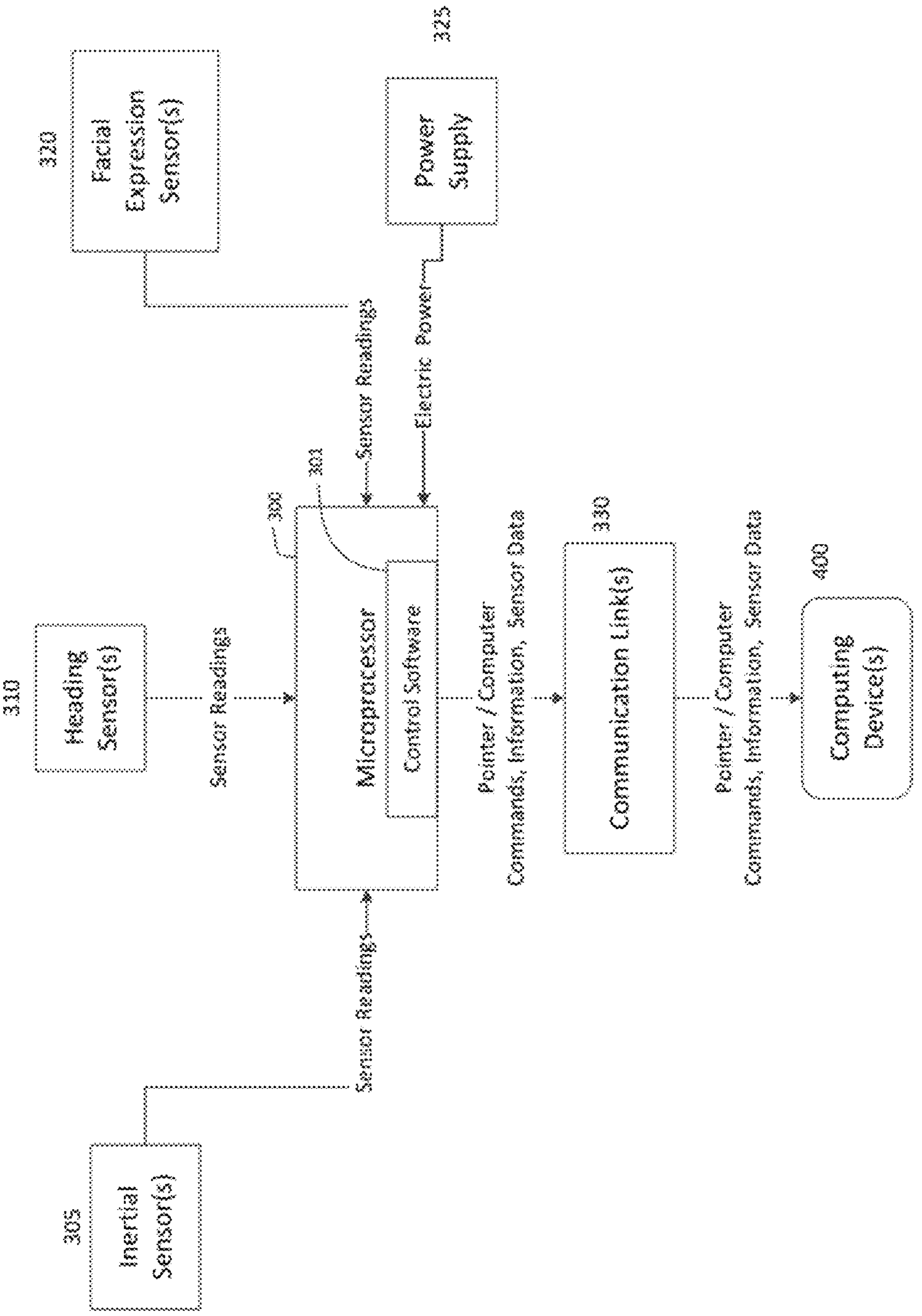
FIG. 5 shows a schematic view of the signal flow for several components of an exemplary controller.

FIG. 5 depicts a schematic representation of the non-structural components of the controller 100. One exemplary embodiment of the controller 100 uses an ATMEGA32U4chip (made by Atmel Corporation) as the microprocessor, an ITG 3200 MEMS gyroscope (made by Invensense Inc.) and an MPR121 proximity capacitive touch controller (made by Freescale Semiconductor, Inc.). The touch controller can be substituted or complemented by a QRD1114 reflective object sensor (made by Fairchild Semiconductor Corporation) to work as an infrared based reflective proximity sensor.

MEMS gyroscopes can be used as inertial sensors by the controller. An exemplary explanation of the use of a MEMS gyroscope and guidance on how to utilize the Coriolis Effect for measuring angular rate of rotation of a rotating body can be found in a document titled "New iMEMS Angular—Rate-Sensing Gyroscope" published by Analog Devices, Inc. at their website (http://www.analog.com/library/analogDialogue/archives/37-03/gyro.pdf). This document explains the mechanical structure of MEMS gyroscopes as well as provides guidance on how to utilize the Coriolis effect for measuring angular rate of rotation of a rotating body. When measuring angular rate (of rotation) of a rotating body using a MEMS gyroscope, the MEMS gyroscope should be placed such that the direction of the vibration/resonance of the resonating mass in the MEMS gyroscope is contained in a plane perpendicular to the axis of the rotation. The direction of displacement of the resonating mass (due to the Coriolis effect) will be perpendicular to both the direction of vibration/resonance of the resonating mass as well as the axis of rotation.

Figure 3:
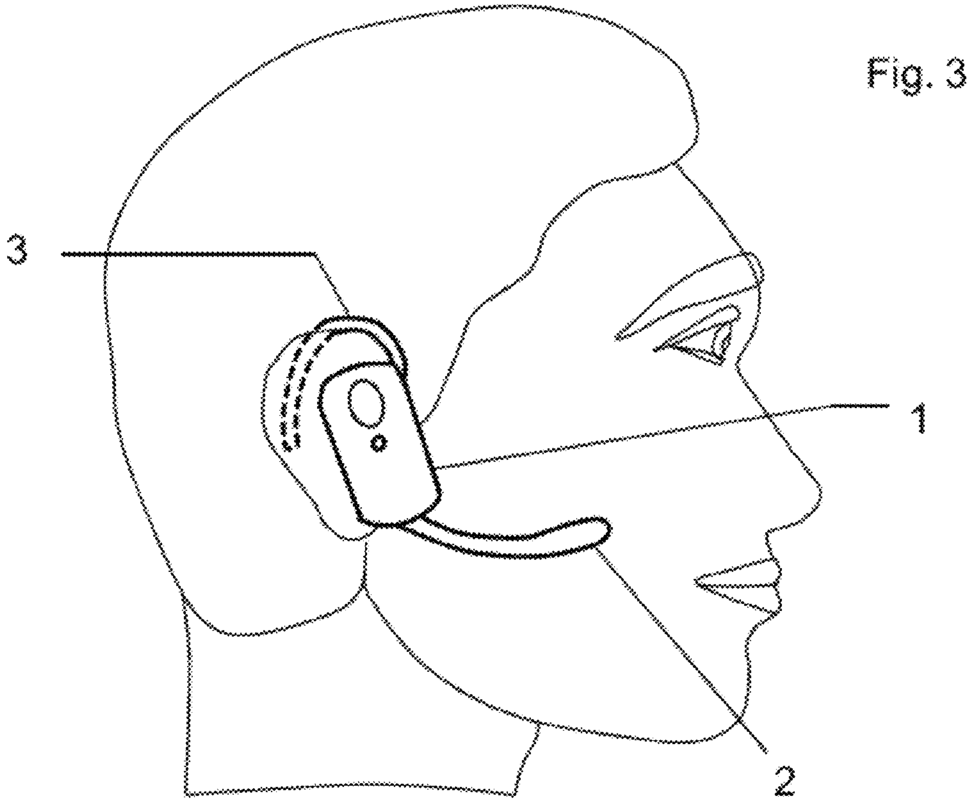
FIG. 3 shows a user wearing an exemplary embedded embodiment of a controller embedded in a phone headset.
Figure 4:
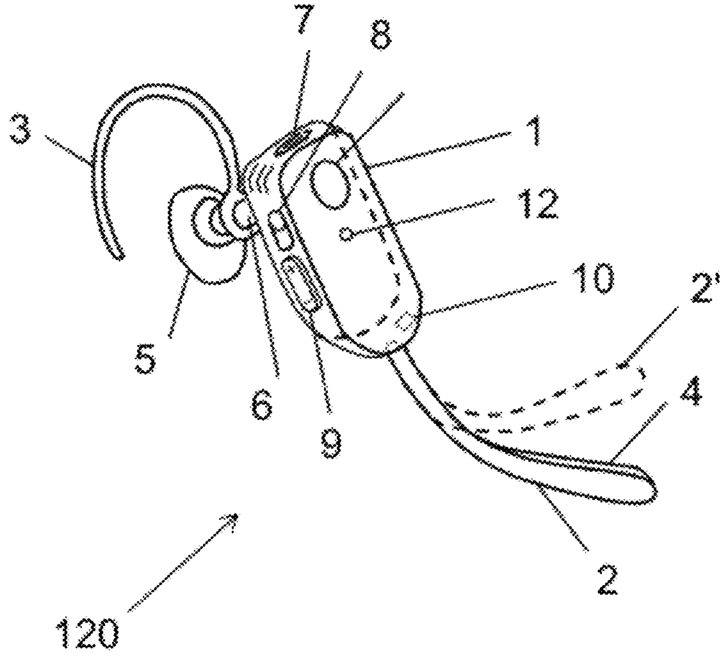
FIG. 4 shows a perspective view of the embedded controller of FIG. 3.

FIGS. 3 and 4 depict an embodiment of an embedded controller 120 embedded within another device such as a wireless phone headset. In addition to having the components in the non-embedded controller 100, when integrated with the components of the wireless phone headset the embedded controller 120 also includes a speaker hidden in the ear plug 5. The embedded controller 120 also includes a volume control 9, an audio microphone 10 and a phone flash/call end button 11. The volume control 9 controls the volume of the speaker in the ear plug 5, and can also function as a sensitivity control for a reflective sensor and/or a capacitive touch sensor.

Figure 8:
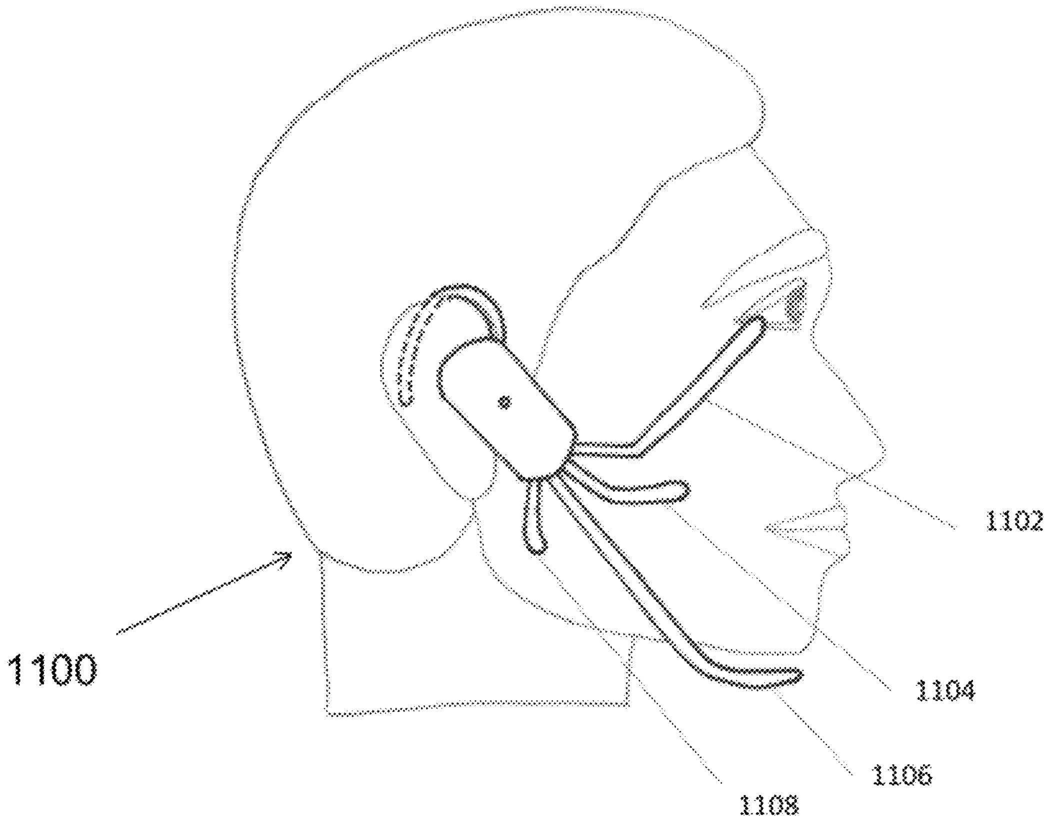
FIG. 8 shows an exemplary controller embodiment with multiple sensor arms.

FIG. 8 illustrates a controller 1100 that includes multiple sensor arms 1102-1108, where different sensor arms are used to monitor different parts of the face. A sensor arm 1102 monitors the eyelids near the corner of the eye, and senses if the eyelid is open or closed by means of a facial expression (FE) sensor, and thereby determines if the user's eye is open, blinking or closed. A sensor arm 1104 detects if the user is smiling by detecting the motion of cheek muscles by use of FE sensors. A sensor arm 1106 detects if the lower jaw is moving, again using proximity or touch sensors. A sensor arm 1108 detects the muscle movement caused by teeth clenching action using a FE sensor. The controller 1100 can be further enhanced by adding sensor arms to detect motion around the areas of eyebrows, forehead, lips, etc., as well as adding other mechanisms such as sip-and-puff switches.

Figure 9:
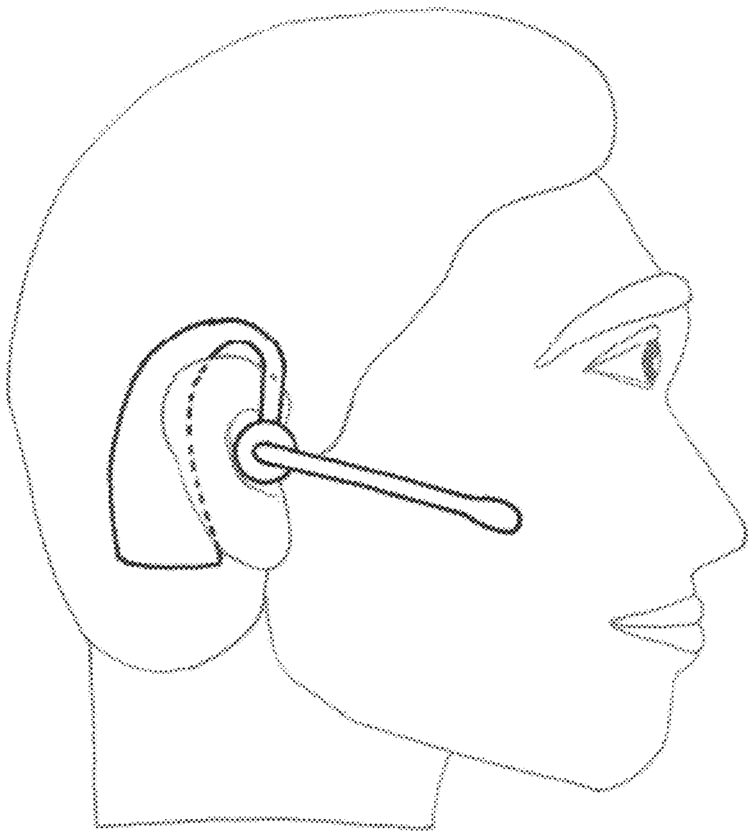
FIG. 9 shows an exemplary controller embodiment with a housing positioned behind the user's ear.
Figure 10:
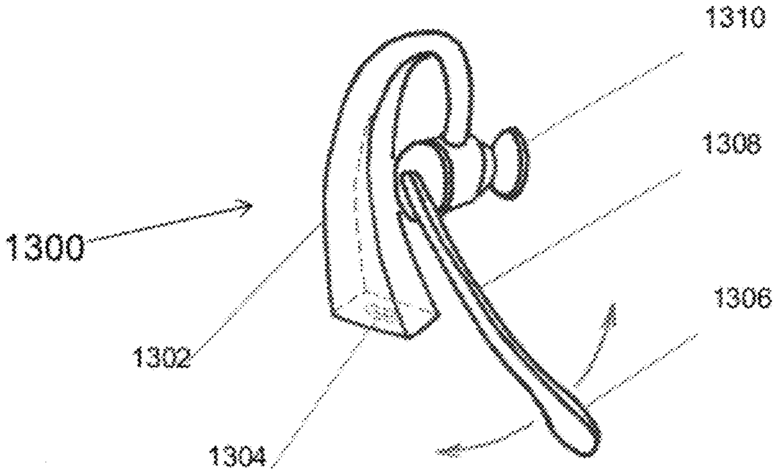
FIG. 10 shows a perspective view of the controller of FIG. 9.

FIG. 9 shows a controller 1300 that includes a housing 1302 shaped and situated differently compared with the previous embodiments. FIG. 10 shows a perspective view of the controller 1300. The housing 1302 is shown hanging behind the ear rather than being directly on top of the ear of the user. Note that even though the housing 1302 (and therefore the axes of the gyroscopes contained within the housing) is not perfectly aligned with the imaginary line segment passing through the center of the user's ears, that does not hamper the performance of the controller. The controller 1300 also includes an on/off switch 1304, a movable sensor arm 1308, and an ear plug 1310. The controller 1300 also includes an FE sensor 1306 at the end of the sensor arm 1308.

Figure 11:
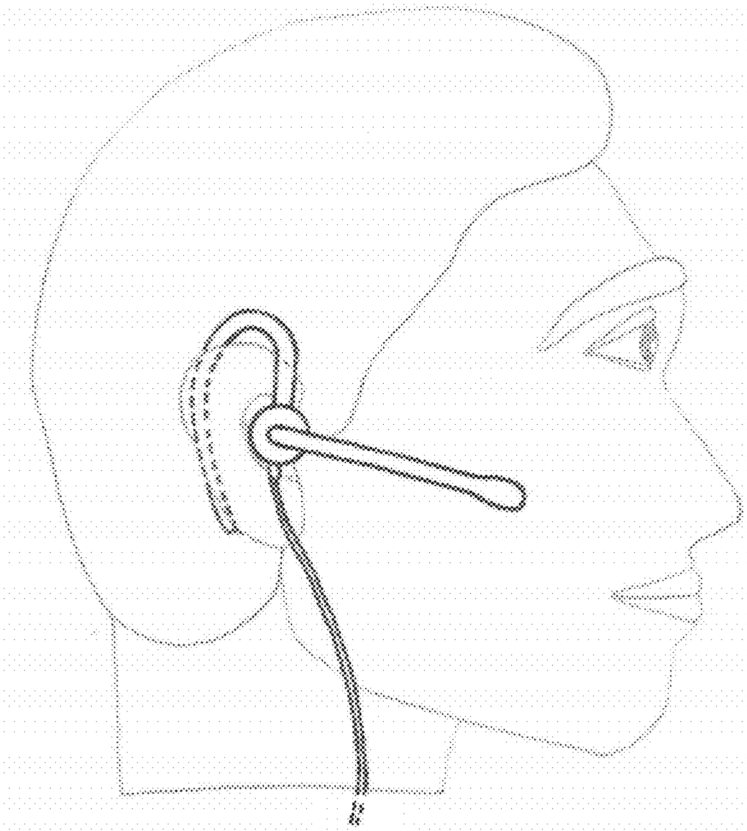
FIG. 11 shows an exemplary embodiment of a controller with a separate component housing.
Figure 12:
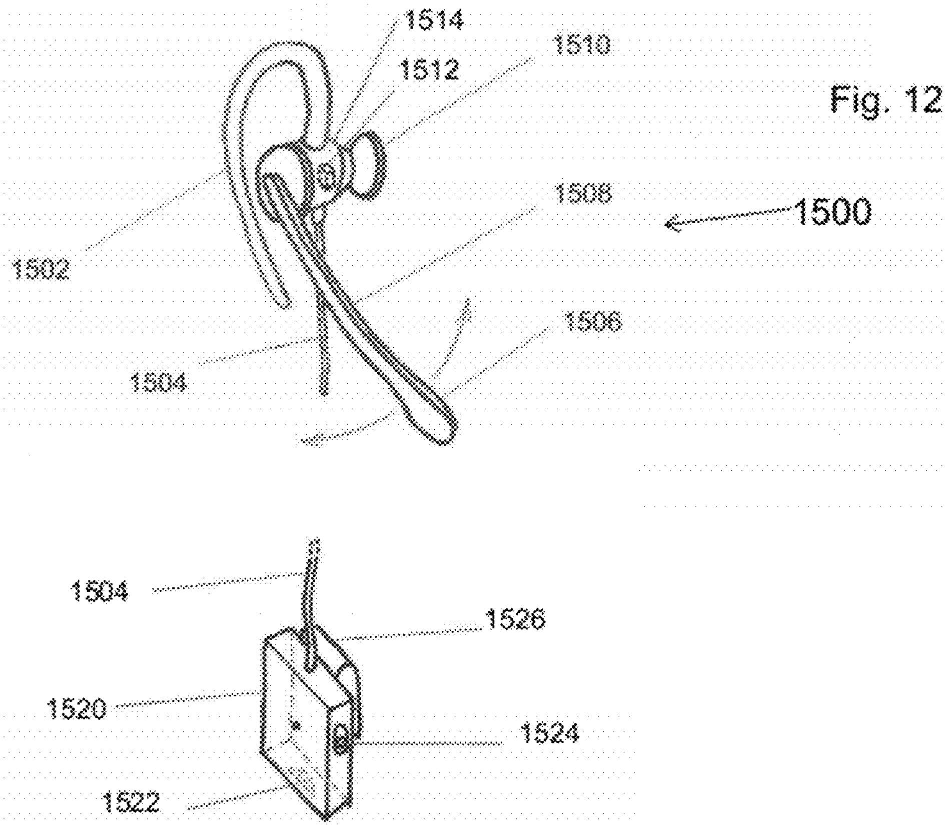
FIG. 12 shows a perspective view of the controller of FIG. 11.

FIGS. 11 and 12 show a controller 1500 that includes a first housing 1514 and a second housing 1520 connected by a cable 1504. FIG. 12 shows a perspective view of the controller 1500 (including both the housings). The first housing 1514 is worn around the ear using an ear clip 1502 and an ear plug 1510. The ear clip 1502 may be removable and optional. The housing 1514 also provides the structure to hold a rotatable and/or flexible sensor arm 1508 that holds a FE sensor 1506. The first housing 1514 is electrically connected to the second housing 1520 which holds a power source, microprocessor, user input/output controls and a communication link to the controlled electronic device. Further, if the FE sensor 1506 requires any specialized electronic controller circuitry, it can be contained in either of the two housings.

The second housing 1520 includes a clip 1526 which may be used to hold the housing 1520 on the user's belt, eyewear, head gear or any other suitable place. The clip 1526 can be replaced by any other suitable mechanism for holding the housing 1520, or the clip 1526 can be eliminated. In a further variation of the controller 1500, the second housing 1520 could be eliminated either by embedding its contents in a yet another device that the user may already have, such as a portable multi-media player, phone, fitness monitoring system, etc., or by sharing/leveraging some of the components that may already be present in the other electronic device. As an example of the latter variation, the controller 1500 can leverage the power source already present in a mobile phone to power all of the components of the controller 1500. The controller 1500 could also leverage the microprocessor present in the mobile phone to run all or parts of the control software it needs to process the sensor information. Further, the controller 1500 could also leverage the communication hardware/software present in the mobile phone to communicate with the controlled electronic device such as a desktop computer. In this way, the controller, which may be head mounted, can be controlling a desktop computer by communicating to it via the mobile phone. As a further variation of the controller 1500, the inertial sensor 1512 could be located in the ear plug 1510 (instead of in the housing 1514) and the ear plug 1510 may also have an audio speaker embedded into it. The controller 1500 also has a power switch 1524 and a USB port 1522.

In another embodiment of the controller 1500, multiple touch and proximity sensors of different types can be embedded on the sensor arm 1508 and/or the housing 1512 or any other structural components, to not only detect facial expressions via detection of facial muscle movement but also to detect if the controller 1500 is being worn by the user. The operation of the controller 1500, including the calibration process, may be made dependent on the wearing of the controller 1500 by the user. That is, the controller can be configured to only actually start reading and/or utilizing the output from the sensors to issue commands for the controlled electronic device when the controller is being worn.

Figure 13:
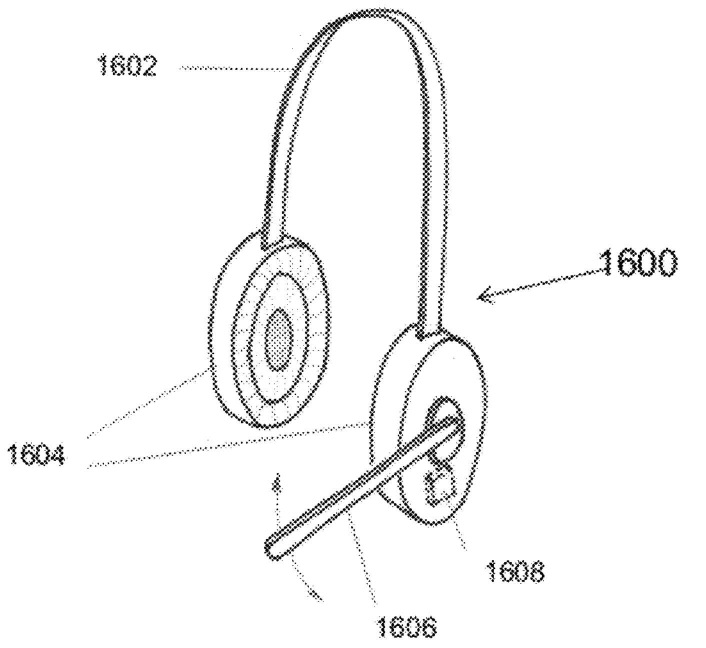
FIG. 13 shows an exemplary embodiment of a controller with motion and expression sensors added to an audio headset.

FIG. 13 shows an exemplary controller 1600 where the sensors are embedded in a headset used for listening to music and/or for use while playing video games that includes a pair of audio speaker assemblies 1604 held together by a headband 1602. An inertial sensor 1608 is attached to the audio speaker assemblies 1604, and a rotatable and possibly flexible sensor arm 1606 extends from the audio speaker assemblies 1604. A power source, microprocessor and other components of the controller 1600 can be self-contained, or can be embedded in a separate housing (not shown), or can be embedded in a device that may or may not be controlled by the controller 1600.

The sensors used by a controller can be flexible (such as a piezo-electric film) and directly stuck to a user's face, and operate on principles of RFID, and thereby communicate wirelessly with the microprocessor of the controller embodiment. In this case, an RFID reader can be used to read the information output wirelessly by the sensors. The RFID reader can be enclosed in the housing or any other suitable location and can be connected to the microprocessor to provide the sensor outputs it reads from the sensors to the microprocessor.

In another embodiment, the sensor arms of the controller can be made telescopic, making their lengths adjustable. The sensors can also be made slidable along the length of the sensor arm, and the sensors can be made extendable in a direction perpendicular to the length of the sensor arm so that they could be brought closer or farther away from the user's face. A sensor arm can also be pivotable at the point where it is attached to a housing or support structure to allow further adjustability. This adjustability can be used for sensing touch/proximity, motion, temperature, etc.).

Figure 14:
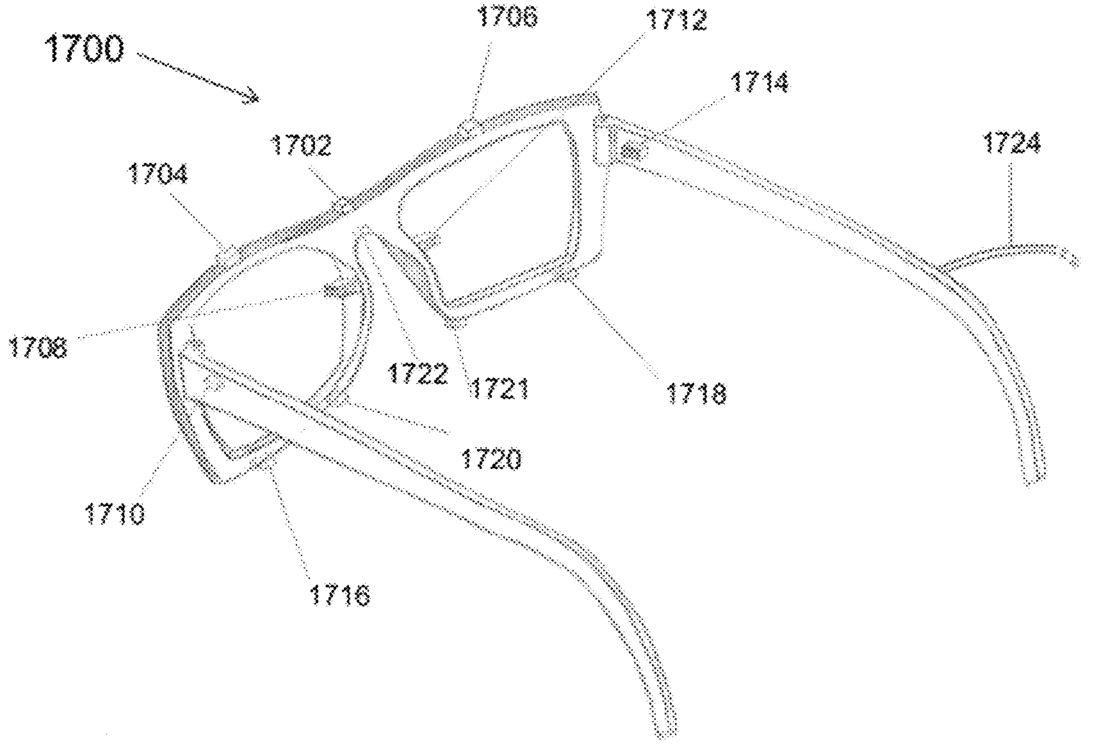
FIG. 14 shows an exemplary embodiment of a controller with facial expression sensors built into eyewear.

In another embodiment, facial expression (FE) sensors of a controller can be mounted on other wearable items such as eyeglasses or similar items and can also be pointed towards the eye to monitor the blinking or closing of one or both of the user's eyes, motion of the eyelids or eyebrows or other areas surrounding the eyes, nose and cheeks. FIG. 14 shows a controller 1700 implemented in eyeglasses. The controller 1700 includes numerous sensors coupled to the eyeglasses structure. A sensor 1702 is situated above the bridge of the eyeglasses to monitor movements and touches by the facial muscles around the eyebrows. Sensors 1704 and 1706 are situated above each of the lenses to monitor movements and touches by the left and right eyebrows. Sensors 1720 and 1721 are situated below the lenses near the bridge to monitor movement and touches of the area around the nose to detect nose twitches. Sensors 1716 and 1718 are situated below the lenses away from the bridge to monitor the upper portion of cheeks to detect smiles and other expressions involving the cheeks and surrounding areas. Sensors 1708 and 1712 are situated on each side of the bridge and sensors 1710 and 1714 are situated on the inside of the temples of the eyeglasses. The sensor pair 1708, 1710 can detect opening/closing of the left eyelid, and the sensor pair 1712, 1714 can detect opening/closing of the right eyelid. A sensor 1722 is embedded on the underside of the nose bridge of the eyewear to detect the proximity/touch with the user's nose and thereby gauge if the user is wearing the eyewear correctly. The processing of information collected from the other sensors can be made conditional on proper wearing of the eyewear as detected by the sensor 1722. Also, the user could be warned via audio, video or tactile signals if the eyewear is not being worn properly. For example, the audio signals could be provided through an audio speaker, the video signals via LEDs, or the tactile signals via vibratory motion of the eyewear itself. The audio speaker may be part of an ear plug of the controller 1700, the LEDs can be embedded on the eyewear so that the user can see when they turn on or flash or change colors in warning, and the vibratory transducer may be on/in the eyewear itself and/or the controller 1700. A wired connection 1724 can be used to couple the eyewear and the sensors to housing(s) (not shown) containing power supply, microprocessor and other components. The housings(s) and rest of the controller can be similar to controller 1500 as shown in FIG. 12.

Figure 15:
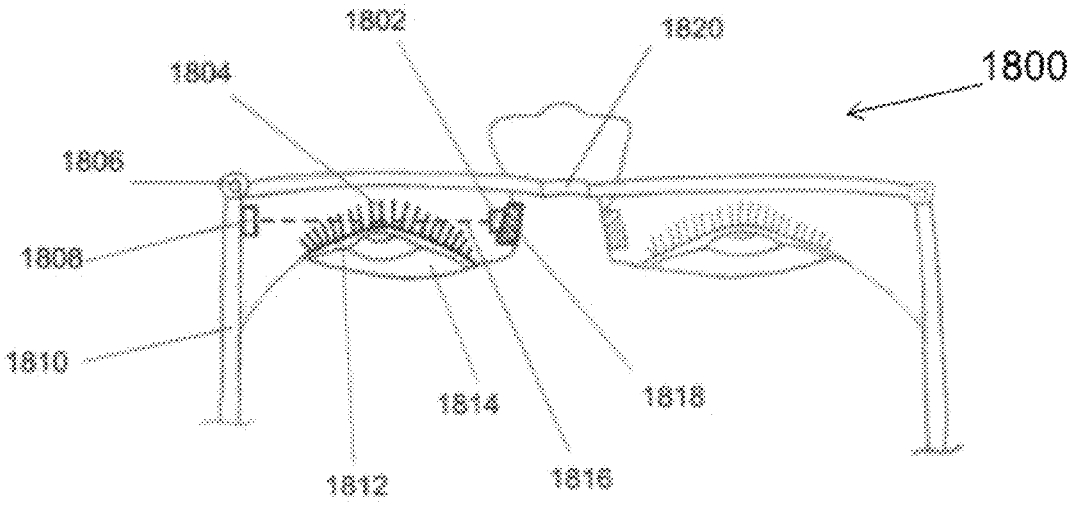
FIG. 15 shows an exemplary embodiment of a controller with sensors built onto eyewear to detect eye blinks/closure via interruption of a light beam.

FIG. 15 shows a partial top view of a user wearing eyewear 1800 that includes a nose bridge 1820, a hinge 1806, a temple 1810 and a nose pad 1818. FIG. 15 also shows the user's eye 1814, eyelashes 1804 and eyelids 1812. A first sensor 1802 that can emit a radiation beam (for example, infrared) is mounted on the nose pad 1818, and could also be mounted in the surrounding area. A second sensor 1808 that can receive the radiation beam is mounted on the temple 1810 on the opposite side of the eye 1814. The sensor 1802 emits a radiation beam 1816 in the direction of the sensor 1808. The radiation beam 1816 can be focused. The opening and closing of the eye 1814 can be detected by interruption or change in intensity of the radiation beam 1816 either by the eye lashes 1804 or the eyelid 1812.

Figure 16:
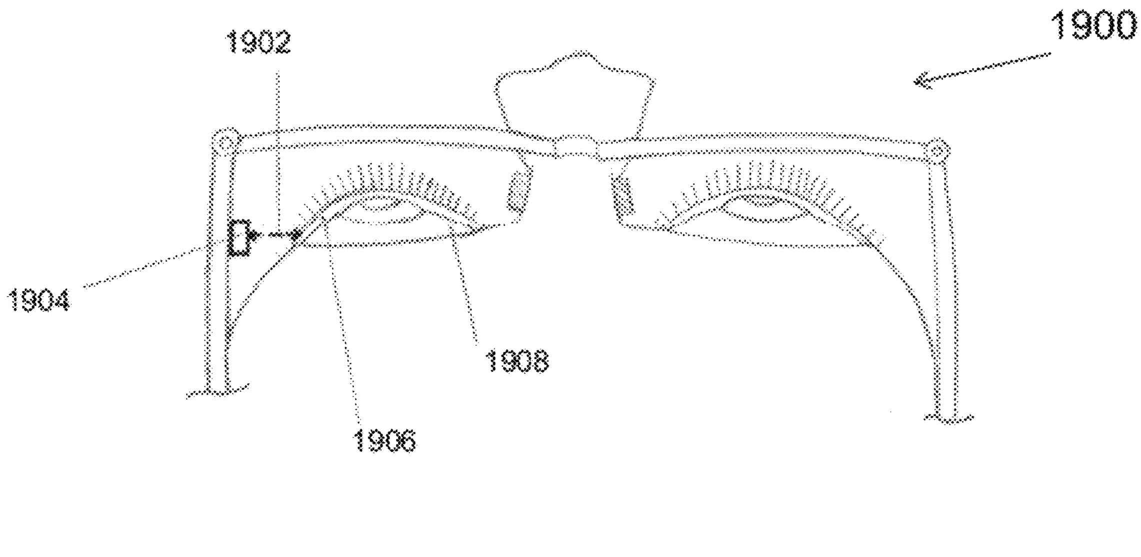
FIG. 16 shows an exemplary embodiment of a controller with sensors built onto eyewear to detect eye blinks/closure via reflection of a light beam.

FIG. 16 shows another controller embodiment 1900 with FE sensors mounted on eyewear. However, in this case a sensor 1904 includes both an emitter and a receiver. The sensor 1904 emits a light beam 1902 towards the eye 1908 and monitors the amount of light reflected back to the receiver of the sensor 1904. The amount of light reflected back to the receiver of the sensor 1904 changes based on the position of the eyelid 1906.

Figure 6:
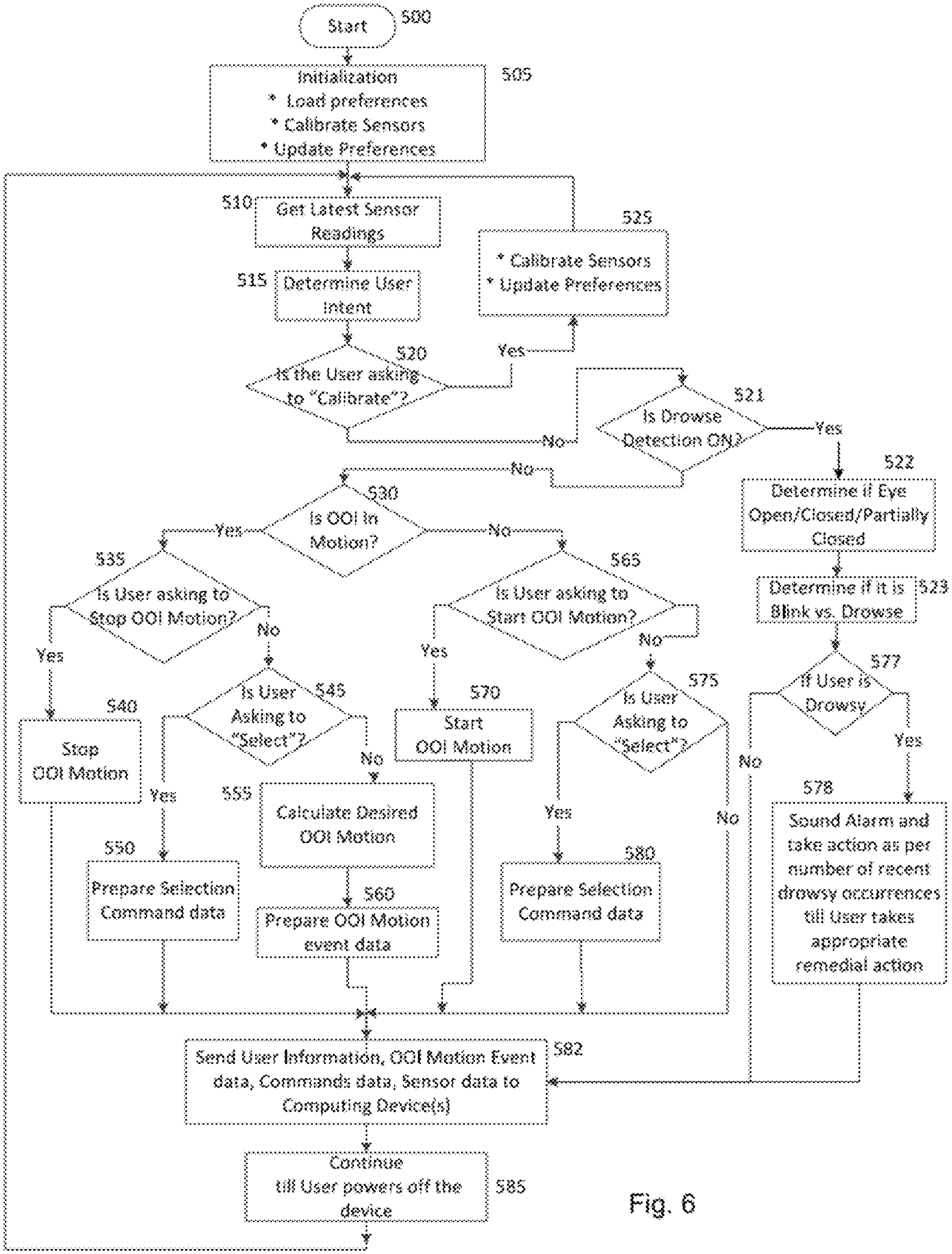
FIG. 6 shows an exemplary flowchart of operation for a controller.

Though the operation of each controller embodiment may be somewhat different from other controller embodiments, the typical underlying behavior is similar. FIG. 6 shows an exemplary flow diagram of operation for a controller. Operation will be described for one embodiment of the controller that controls a computer pointer/cursor/selected graphical object according to the motions of the users' head and facial expressions. The controller can also perform facial expressions management and drowsiness detection.

If the user-interface of the application(s) running on the controlled electronic device does not include the concept of a pointer or cursor, then there may only be selection of graphical objects on the display possible (and no motions of those objects). In this case, the motions of the users head and facial expressions can be used to move the selection of the graphical object (rather than the object itself) and perform operations on currently selected object(s). An example of such as situation is when the electronic device being controlled is a household washing machine with an array of physical buttons and/or dials/input devices, or an array of buttons/dials/input devices displayed on a screen that the user may not be allowed to move. In this case, the head motions of the user can change what input device(s) is/are selected and the facial expressions can cause the commands on those input devices (such as press, reset, dial up/down, etc.).

For clarity, the term "Object of Interest" (OOI) will be used to stand for any virtual objects such as a cursor, pointer, view/camera angles, direction of interest, selected graphical object on the display screen of the controlled electronic device, as well as to refer to currently selected button/dial/slider control/input mechanism that is physically present on the controlled electronic device. If the OOI is such that it is not physically or virtually movable, then "movement" or "motion" of that OOI will mean moving the designation of which input mechanism is currently the OOI.

FIG. 5 shows a schematic layout of functional components of an exemplary controller embodiment. The following description refers to the controllers 100 and 120 of FIGS. 1-4, but can be readily applied to other controller embodiments. The motions of the user's head are captured by inertial sensor 305 and converted to OOI motion commands by control software 301 running on a microprocessor 300. The direction and/or position of the user can be captured by heading sensors 310, and the facial expression of the user can be captured by facial expression sensors 320, and all of these sensor readings are transmitted to the control software 301 running on the microprocessor 300. The commands generated by the control software 301 are communicated via communication link 330 to the electronic device 400 which is being controlled.

The user can wear the controller 100 by putting the ear plug 5 in his/her ear, and optionally also using the ear clip 3 for a further secure fit. Note that the user is not required to be in a sitting/standing/upright position to use the controller 100 effectively. The user could even be lying on a bed, if they so choose or prefer. This ease of use is possible due to the OOI motion heuristics explained below. Expressions on the user's face are captured by the FE sensors 320. For the controller 100, the FE sensors include the photo reflective sensor 4. The sensor arm 2 can be adjusted so that the FE sensor 320 is over the area of the face around the cheek bone of the user which juts out during the expression of a smile. When the FE sensor 320 is operating, it emits a light of specific frequency which is then reflected by the face and sensed by the receiver part of the sensor 320. A light filter can be used that allows in only those frequencies of light that are of interest (that is, those frequencies emitted from the emitter part of sensor 320); to help minimize improper readings caused by stray light or other light sources. The emitted light can also be modulated. The act of smiling can be detected by change/increase in the amount of light reflected by the face, and the sensor reading sent by the FE sensor 320 to the microprocessor 300. The control software 301 can process the smile as a click, double click, click-and-drag or other command as per heuristics described herein.

Figure 7:
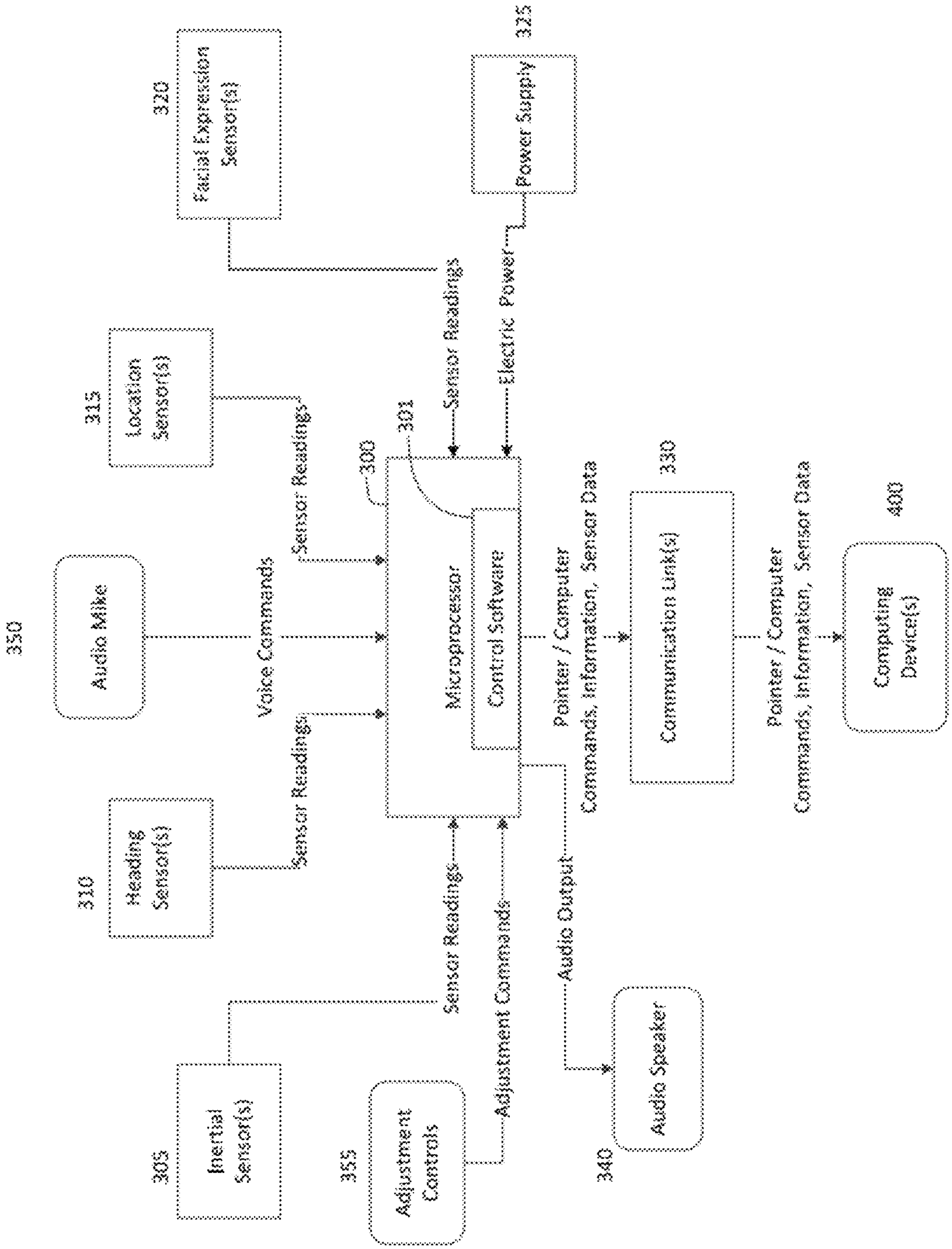
FIG. 7 shows a schematic view of the signal flow for several components of another exemplary controller.

FIG. 7 shows a schematic layout of functional components of another exemplary controller embodiment. As in FIG. 5, the control software 301 runs on the microprocessor 300 which receives power from a power supply 325. Sensor readings from inertial sensors 305, heading sensors 310, location sensors 315 and FE sensors 320 are input to the microprocessor 300. In this controller embodiment, voice commands can also be input through an audio microphone 350, and adjustment commands can be entered using controls 355. The voice commands could be recognized and translated to cause OOI motion as well as any other commands for the controlled electronic device. The control software 301 can provide audio output through speaker 340. The commands and other information generated by the control software 301 are communicated via communication link 330 to the electronic device 400 which is being controlled.

FIG. 6 illustrates an exemplary flow chart for high level controller operation. Although not explicitly mentioned in the flowcharts or following discussions, the sensor readings can be cleaned using noise removal techniques (hardware and software). One embodiment uses a software low-pass filter algorithm. Some heuristics described herein and used in other embodiments are not illustrated in FIG. 6, and instead are explained in separate figures and verbal explanations. While FIG. 6 illustrates an embodiment that either performs drowsiness detection or controls an electronic device, other embodiments can simultaneously allow multiple functionalities of the controller, such as OOI motion, selection commands, drowsiness detection, facial expression management, etc.

At block 505, the controller goes into initialization/calibration mode upon start up giving the user a chance to load and update preferences, calibrate sensors and adjust sensor sensitivity settings. If the user does not change these settings, the controller can use the initialization/calibration settings stored in the memory of the microprocessor. The controller can include factory default settings in case the settings have never been set by the user. User instructions and audio feedback can be given to the user via an audio speaker while the calibration is in progress and when complete. Note that the initialization/calibration period can last for a fixed time period right after the power is turned on, or it can be started based on a specific trigger such as pressing the power button briefly or some other action. Alternatively, an additional touch sensor can be embedded on a controller housing or on an ear plug to trigger initialization/calibration when the controller is worn by the user, or only the first time it is worn after being powered on.

At start up time, the sensor arms can be adjusted by the user as per his/her preference so that the sensor can detect facial expressions. For example, to detect a smile, the sensor arm should be adjusted so that the FE sensor is over the facial muscles that move the most in the outward direction during the expression of a smile. In this way the FE sensor can have the most sensitivity for that expression. After this adjustment, the user can press a power button or other designated button down briefly (or some other command sequence) to trigger the calibration process whereby the control software records the sensor reading as a baseline to compare future readings with in order to determine if the user is smiling or making some other detectable facial expression. In some embodiments, the facial expression is considered to be started only when the facial muscles actually touch the sensor. Touch sensors such as capacitive touch sensors indicate if a touch is achieved, while proximity sensors can indicate a change in proximity. Certain proximity and touch sensors continue to provide readings indicative of proximity even after a touch is attained. In other embodiments, the expression is considered to be started if the reading of the sensor changes by a preset or configured amount. This amount can be measured in terms of the raw reading or a percentage difference between the raw readings and the baseline. In yet other embodiments, the FE sensor can be a strain sensor that senses mechanical strain. When the strain sensor is temporarily stuck to the part of the face, it will detect strain caused by movement (stretching or shrinking) of muscles, and then the strain readings can be used to detect the facial expression in a fashion similar to touch and proximity readings.

After initialization, at block 510 the system gets the latest sensor readings as well as control readings (such as button presses to request calibration, change in sensitivity, etc). At block 515 the system determines the user intent by processing the sensor readings and user input. Blocks 510 and 515 provide an opportunity for the system to re-perform calibration, adjust sensitivity, adjust user preferences, etc and can also provide a reading for facial expressions intended to trigger a command. At block 520, the system determines if the user is triggering a sensor calibration. If a sensor calibration is triggered, then at block 525 the sensors are calibrated and the user preferences are updated. After calibration, control passes back to block 510. If a sensor calibration is not triggered, then control passes to block 521.

At block 521, the system checks if drowsiness detection is activated. If drowsiness detection is activated control passes to block 522, otherwise control passes to block 530. At block 522, the system determines if the user's eyes are open, closed or partially closed, and at block 523 the system determines if the detected condition is a normal blink or an indication of drowsing. At block 577, if the system determines that the user is drowsy, then at block 578 sounds an alarm and takes action which may depend on the number of drowsiness events detected in a period of time, and may wait for user remedial action before the control passes to block 582. At block 577, if the system determines that the user is not drowsy then control passes to block 582.

At block 530, the system determines if the OOI is in motion. If the OOI is in motion, then control passes to block 535, and if the OOI is not in motion control passes to block 565.

At block 535, when the OOI is in motion, the system checks if the user is trying to stop the OOI. If the user is trying to stop the OOI, then at block 540 the system stops the OOI motion and control passes to block 582. If the user is not trying to stop the OOI, then at block 545 the system checks if the user is trying to perform a selection command (such as a click, click-and-drag, etc). If the user is trying to perform a click command, then at block 550 the system performs the click command and control passes to block 582. If the user is not trying to perform a click command, then at block 555 the system calculates the desired OOI motion, at step 560 prepares OOI motion event information and control passes to block 582.

At block 565, when the OOI is not in motion, the system checks if the user is trying to start OOI motion. If the user is trying to start OOI motion, then at block 570 the system starts OOI motion and control passes to block 582. If the user is not trying to start the OOI, then at block 575 the system checks if the user is trying to perform a selection command. If the user is trying to perform a selection command, then at block 580 the system prepares data for performing the selection command and control passes to block 582. If the user is not trying to perform a selection command, then control passes to block 582.

At block 582, the system sends appropriate data to the electronic device, for example user information, motion event and selection and other command information, sensor data (including inertial sensor, facial expression sensor, etc) facial expressions management information, drowsiness detection information, etc. Then at block 585 if the user powers off the controller, the system shuts down, otherwise control passes back to block 510 to start processing for the next iteration.

As another example of sensor initialization and calibration, the sensor arm can be adjusted to detect eye blinks. In this case, the control software can prompt the user to close and open eyes naturally to record the sensor readings and then those readings can be used during the actual operation of the controller to determine if the user's eye is open or closed at any given point in time.

In some controller embodiments, as part of the initialization and calibration process, the user may be prompted by the control software or instructed by written operating instructions to hold their head steady after powering the controller on for certain amount of time. This can be used by the system to get baseline readings from all or certain sensors of the controller. Future readings from those sensors can be compared with the corresponding baseline readings to determine change in state, which can then be translated to appropriate commands for the controlled electronic device. The controller does not generate any selection or motion events during the calibration process.

In some controller embodiments, the control software can also provide functions such as processing, analysis, retrieval and sharing of controller usage, facial expressions management, body motion, drowsiness and other information to the user as well as other electronic devices. Regular controller functions may or may not be suspended during these functions.

FIG. 19 lists some parameters with exemplary values that can be used by the control software. The following discussions will refer to those parameters (listed in all capital letters) when discussing various exemplary algorithms. The numerical quantities and preference settings in FIG. 19 and otherwise are exemplary, and they can be changed or configured by the user as well as by the software that implements the described algorithms, and possibly based user preference settings. If the user does not change these settings, the control software can use default values.

Following the initialization/calibration process, the controller can go into an indefinite period of operation where the control software gets new readings from its sensors and input components at regular intervals and process them in an iterative fashion, until the controller is stopped or powered down. The controller can use the concept of SENSOR_READING_TIME_INT (see parameter P#1 in FIG. 19) wherein the control software starts reading all sensors and processes their output at fixed time intervals. The control software can read all the sensors after a fixed time interval set by P#1 which indicates the time interval between two sets of sensor readings. This method provides the sensor readings at fairly fixed time intervals. Note that this interval could be higher and lower based on the speed of the microprocessor and/or processor in the controlled electronic device, the needs of applications/operating system running on the controlled electronic device as well as characteristics of the sensors being used. The controller can use the concept of DELAY_TO_NEXT_ITERATION (see parameter P#2 FIG. 19), where rather than starting a new iteration every certain amount of milliseconds, the control software waits for the specified amount of time after the end of one iteration before starting the next iteration. Based on what the user is doing, the time taken to process sensors readings may vary from iteration to iteration. Using this method assures a certain minimum time gap set by P#2 between sensor readings performed as part of any two consecutive iterations. This concept/parameter could be used instead of SENSOR_READING_TIME_INT. This method can be helpful if the sensor reading and processing take a long time, which may not leave much time between the end of one iteration and the start of the next iteration, and thereby not leave much time for sensors that require a certain minimum amount of time between readings.

Various facial expressions of the user can be detected and interpreted to cause various actions/commands on the controlled electronic device. The following sections describe how based on the time taken to complete an expression and the amount of head motion at the time of the user's action of expression, different interpretations and therefore different commands for the controlled electronic device can be triggered.

A primary controlling expression (PCE) is a designated facial expression that will be most used in the heuristics for the functioning of the controller. For example, a PCE can be used to determine if the graphical object pointed to by the current location of pointer or cursor on the controlled electronic device display screen should be selected, or if the OOI should be moved, or if a left mouse button press/release event should be generated, or if a currently selected input mechanism (such as a physical button) on a home appliance should be "pressed" or turned up/down, etc. Note that different controller embodiments can use different facial expressions as the PCE. One controller embodiment can use a smile as the PCE because of the ease of performing it, pleasant appearance, social acceptance and possible health benefits. Other controller embodiments can use eyebrow raises, jaw drops, teeth clenches, or other facial expression as the PCE. The principles in the algorithms described here for detecting and processing a PCE can be used for others as well. Given that humans can have different levels of facility in performing one expression versus another, the parameter values can be adjusted to suit different users. In addition, FE sensor readings can increase based on the expression of certain PCEs whereas the opposite may be true for other PCEs. For example, based on the placement of the FE sensors, a proximity sensor reading may decrease as the expression of a smile increase on a user's face, whereas the opposite behavior may be true for the expression of an eyebrow raise. Two different kinds of FE sensors may also demonstrate differing trends in the readings for the same facial expression.

Multiple expressions can be tagged as PCEs and can be used interchangeably, thereby giving user flexibility as well as comfort by spreading out the effort of performing the PCE amongst various muscle groups. Smiles, eyebrow raises and lower jaw drops can all be used as PCE's, as well as other expressions and body motions.

A FE sensor senses an expression by the user based on what type of sensor it is. For example, a proximity capacitive touch sensor can sense when an expression is in progress by certain muscles getting closer or farther from the sensor and/or actually touching the sensor. A strain sensor can sense an expression by changes in the strain experienced by the sensor. If the FE sensor is a mechanical switch, the facial muscle movement may actually turn the switch on or off. A flex sensor can be touching/monitoring the face though spring action and measure the variation in the deflection it experiences as the facial muscles move. A mechanical switch can also have a spring loaded action that would allow it to measure the level of facial muscle movement along with a discrete "on"/"off" action. Any combination of FE sensors may also be used.

Figure 20:
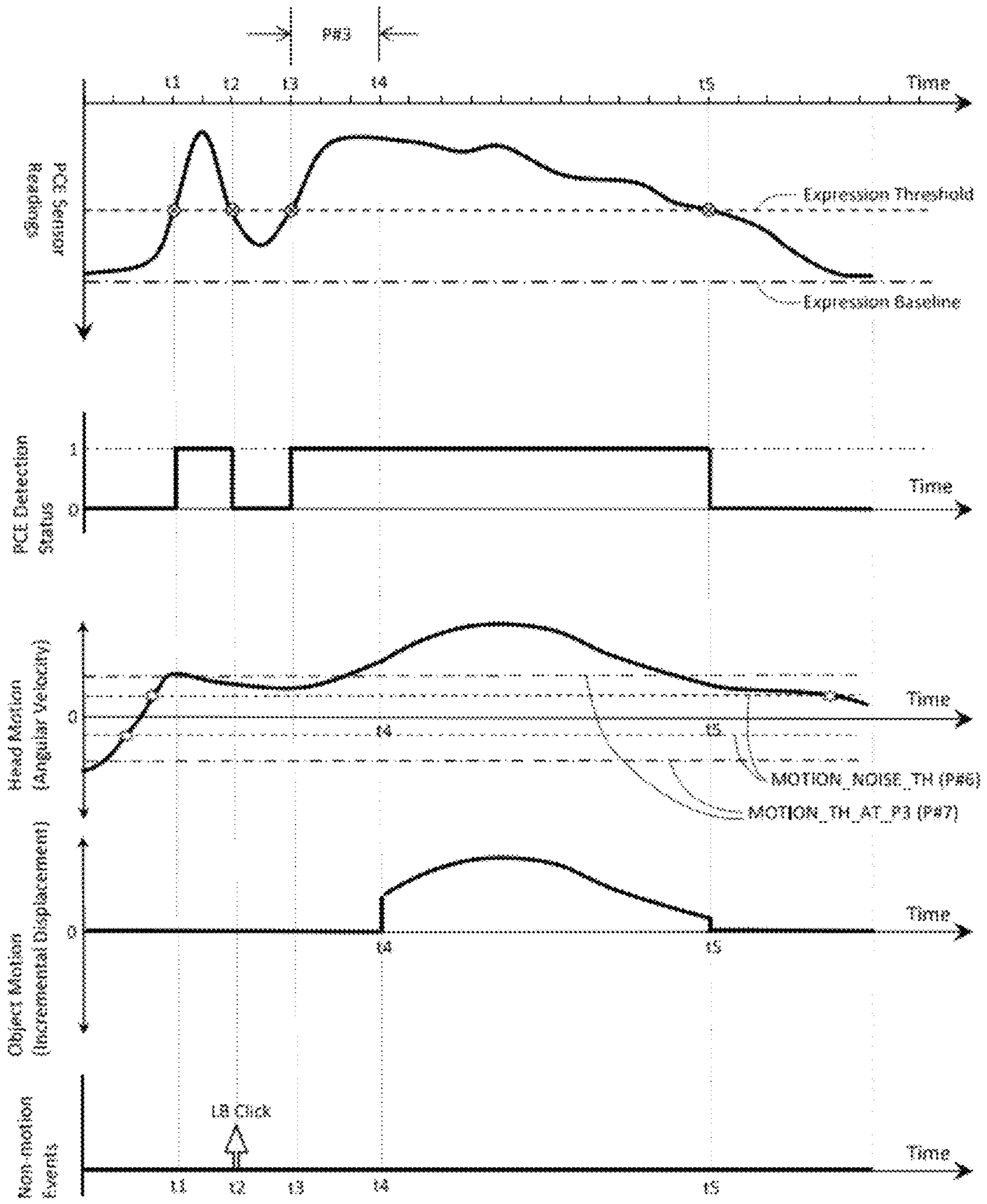
FIG. 20 shows exemplary heuristics for primary controlling expression detection, and object of interest motion and selection functionality.
Figure 21:
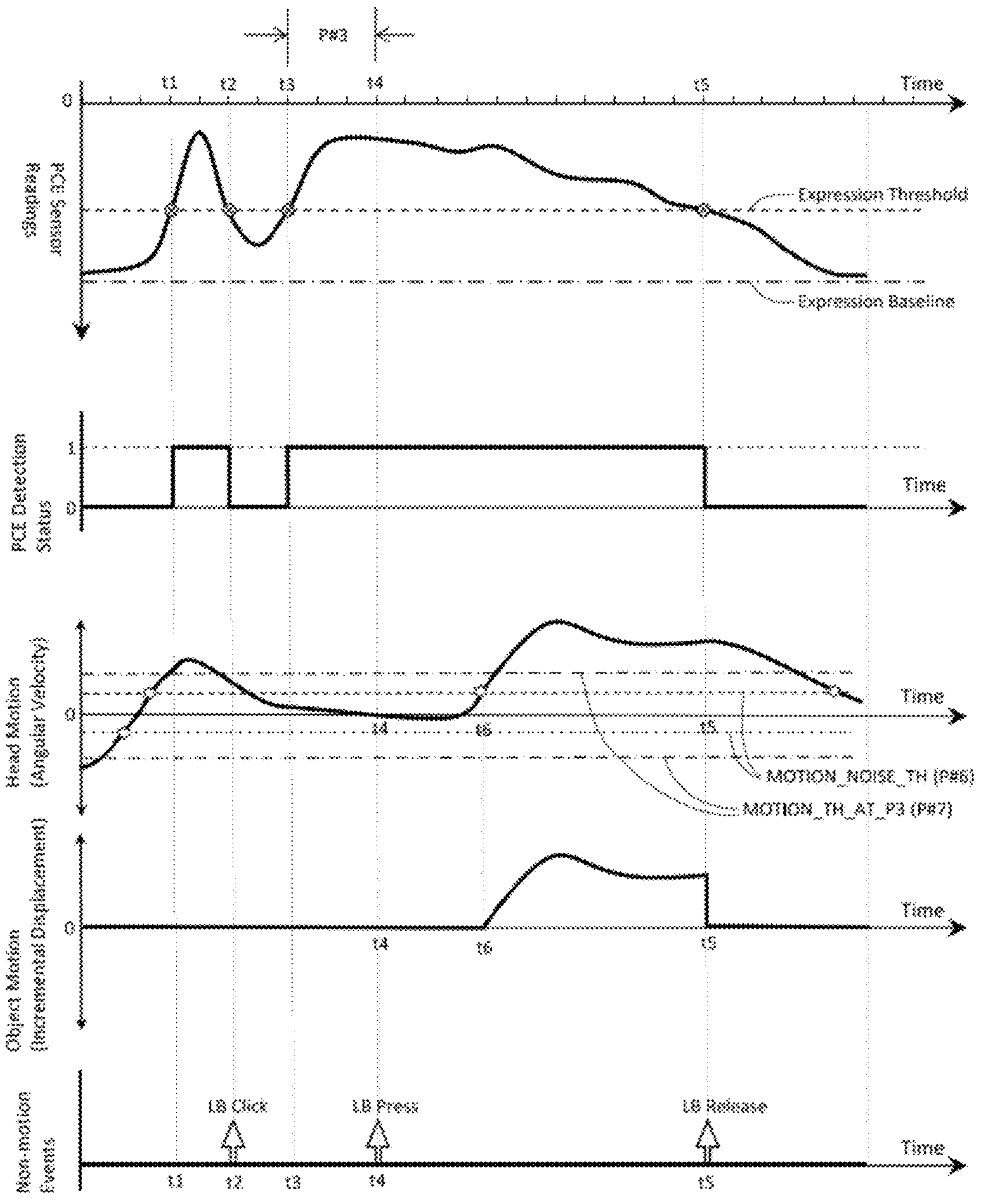
FIG. 21 shows exemplary heuristics for click and drag functionality.

FIG. 20 illustrates some exemplary heuristics of FE detection. These heuristics can be used regardless of if the expression being detected is a PCE or otherwise. For the purpose of illustration of this and following heuristics, the PCE will be a smile, the FE sensor will be a photo-reflective proximity sensor, the inertial sensor will be a multi-axis gyroscope and the controlled electronic device will be a computer, unless explicitly noted otherwise for a particular heuristic. (Note that the principles presented in this and other heuristics can be applied to any type of facial expressions, facial expressions sensors, inertial sensors, body motions used to move the controller, as well as controlled electronic devices.) The top graph shows the variation of proximity reading as taken by the proximity sensor adjusted to take readings from the cheek muscle of the user around the area of the cheek which moves outward in most noticeable fashion during the expression of a smile. The "Expression Baseline" line shows the reading from the proximity sensor obtained during the initialization/calibration phase when the user was not smiling. The "Expression Threshold" line signifies the threshold below or above which the PCE is termed to be active/detected or inactive/undetected, respectively. For example, if the FE sensor reading falls below the Expression Threshold line for a smile, then the expression of a smile is deemed to have started. (Note that in FIGS. 20-24 the positive axis of the FE sensor points downwards.) On the other hand, if the FE sensor reading goes above the Expression Threshold line, then a smile is deemed to have ended. The intersections of the FE sensor reading curve with the Expression Threshold line signify changes in the PCE detection status. Parameters P#11 (PCE_EXPN_TH_CALC_PERCENT) and/or P#12 (PCE_EXPRN_TH_CALC_DIFF) of FIG. 19 can be used to calculate the Expression Threshold based on the Expression Baseline values for any particular FE sensor.

Parameter P#11 is a percentage based amount used in computing Expression Threshold for a particular PCE based on the Expression Baseline reading for that expression and sensor. If using P#11 for calculating Expression Threshold, then the Expression Threshold would be calculated as:

$$\text{Expression Threshold}=\text{Expression Baseline}-(\text{Value of } P\#11)\times(\text{Expression Baseline}-\text{Minimum Proximity Reading})$$

where "Minimum Proximity Reading" is the absolute minimum proximity reading that is possible with the particular type of FE sensor.

Parameter P#12 is a differential amount used in computing Expression Threshold for a particular PCE based on the Expression Baseline reading for that expression and sensor. If using P#12 for calculating Expression Threshold, then the Expression Threshold would be calculated as:

$$\text{Expression Threshold}=\text{Expression Baseline}-(\text{Value of } P\#12).$$

When proximity reading falls below the Expression Threshold, the expression is said to be detected. The second graph of FIG. 20 shows the "PCE Detection Status" graph. The PCE is considered to be detected (that is PCE Detection status of 1) from times t1-t2 and then from times t3-t5.

In a variation of the previous PCE detection heuristic, a different Expression Threshold value can be used to determine the end of a PCE, compared to what was used at the start of PCE. The start Expression Threshold can still be calculated using P#11 or P#12 as described in the previous heuristic. However, the end of the PCE is determined using a different end Expression Threshold value. For example, if the value chosen for the end Expression Threshold is between the Expression Baseline and the start Expression Threshold value, then that would allow the user to hold the PCE with less effort than that was required to start the PCE. This enables the user to hold the PCE for a longer duration, thereby contributing to the ease of use while performing long continuous motions of the OOI as explained in following sections.

FIG. 20 also illustrates exemplary heuristics for a selection command (for example, a left mouse button click on a computer). A selection command can be generated if the user performs the PCE for a duration equal to at least the value of parameter P#4 (MIN_PCE_DURATION_FOR_CLICK) and no longer than the value of parameter P#5 (MAX_PCE_DURATION_FOR_CLICK). Parameter P#4 is the minimum time duration a PCE has to last before that PCE can be eligible to cause a selection command. Parameter P#5 is the maximum time duration a PCE can last for it to be interpreted as an intent to cause a selection command. FIG. 19 provides exemplary values of P#4=75 milliseconds (ms) and P#5=300 ms. At the top of FIG. 20 and for the graphs below, every tick on the time axis of the PCE sensor readings graph indicates duration of 100 ms. (Note that a PCE Sensor is just a FE Sensor that is being utilized to detect or monitor a PCE.) Therefore, the PCE detected between times of t1 and t2 lasts for 200 ms which is more than P#4 (75 ms) but less than P#5 (300 ms). Therefore, a selection command (such as a left-button (LB) click on computer) is generated and communicated to the controlled electronic device at the end of the facial expression, which is at time t2. This is depicted on the bottom graph "Non-motion Events" of FIG. 20.

Special heuristics are not required for a double click command; as it can use the selection heuristics described above. If the user can simply complete two clicks back to back and meet the double click speed setting on the operating system of the controlled electronic device, then the two clicks can be interpreted as an intent to double click at the current pointer/cursor location on the electronic device or can be interpreted as a string of two regular clicks depending on the situation.

Heuristics for object of interest (OOI) motion can use the motion sensed by the inertial sensors of the controller to drive motion of the OOI. However, a PCE should be currently detected and active for the sensed motions to be translated into commands/events that cause OOI motion on the controlled electronic device. The motion of an OOI can be started only when a PCE has been continuously active for a certain minimum time period. This minimum time period is set by parameter P#3 (TIME_TO_HOLD_PCE_BEFORE_MOVEMENT). FIG. 19 shows P#3 with an exemplary value of 300 ms. The OOI motion can possibly continue (subject to restrictions described below) as long as the PCE is in progress. When the PCE ends, the motion comes to an end and can be restarted only when a new PCE is started and held for at least P#3 time duration. The direction and amount of OOI motion is dependent on the motion sensed by the inertial sensors of the controller. The inertial sensors should sense more motion than a threshold for that motion to result in motion of the OOI. This comparison is done by comparing the absolute value of the motion sensed with the threshold value. Parameter P#6 (MOTION_NOISE_TH) of FIG. 19 sets this threshold and is called the motion noise threshold. Parameter P#6 of FIG. 19 has an exemplary value of 1 degree per second for an embodiment where the controller is worn on the head. The third graph of FIG. 20 shows an exemplary graph of head motion as sensed by the inertial sensors of the controller, for such an embodiment. The head motion is shown to be greater than the P#6 value during the entire duration between t3 and t5 which is the duration when PCE is active. However, as described above, the OOI motion only begins after P#3 amount of time is passed after the initiation of the PCE. Given that t4=t3+P#3, the actual motion of the OOI is observed only during the time period from t4 through t5. This is illustrated by the fourth graph, "OOI Motion" in FIG. 20. Note that the shape of this curve between t4 and t5 is shown similar to the "Head Motion" curve (as sensed by the inertial sensors of the controller) during the same duration. This is because the angular velocity sensed by the controller at any instant is used to calculate the incremental OOI motion at that instant. This approach avoids the use of numerical integration techniques to compute angular positions (based on sensed angular velocities) to use those angular positions to drive the position of the OOI. Avoiding numerical integration not only simplifies the software algorithms and makes them faster, but also avoids errors that are part of any numerical integration techniques.

The yaw angular velocity readings can be used to control the X-direction (horizontal) motion and the pitch angular velocity can be used to control the Y-direction (vertical) motion of the OOI. Other embodiments can use angular velocity in the roll direction or rate of change in magnetic heading instead of the yaw angular velocity.

A gyroscope with at least two axes (one for yaw and another for pitch) can be used as the sole inertial sensor. Some types of inertial sensors may provide a non-zero reading even when perfectly still. Therefore, readings indicative of instantaneous angular velocities can be compared with baseline readings (when head was still) and the difference between the two can be used to compute OOI motion on the display screen of the controlled electronic device. The difference in readings corresponding to angular velocity (represented by ΔV) at a particular point in time can be used as the basis for translational displacement of the OOI at that point in time. The following formulas can be used to compute translational displacement T of the OOI in some embodiments:

$$T_x = \Delta V_{Yaw} * \text{Scaling\_Factor}_x * \text{Gain\_Factor}$$

$$T_y = \Delta V_{Pitch} * \text{Scaling\_Factor}_y * \text{Gain\_Factor}$$

The x and y scaling factors are constants that can be left at 1.0 or adjusted up or down based on the need to slowdown or increase the speed of the OOI being moved or selected on the display. Negative scaling factors can be used to reverse the direction of the motion of the OOI along the corresponding axis. The gain factor can be set to a constant value of 1.0, or can be variable based on the value of angular velocity ΔV at given point in time. One such gain factor is illustrated in FIGS. 25-27 discussed in the following sections. Note that for ease of understanding, the OOI graphs depicted in FIGS. 20-24 use a constant value of 1.0 for the scaling factors as well as gain factors.

Click and drag functionality is commonly employed by computer users while interacting with the computer using a mouse. In this scenario, the user clicks and holds the left mouse button and then starts moving the mouse (while keeping the button pressed) and then releases the left mouse button when the cursor/pointer/graphical object is at the desired location. This same effect can be achieved by using the controller as follows (the Click and Drag heuristic). The user can start a PCE while holding the controller steady so that the motions are within a threshold amount specified by the parameter P#7, (MOTION_TH_AT_P3 listed in FIG. 19). Parameter P#7 is used to determine if the controller is being "held" steady enough at that point in time. This value can be used to check motion at anytime from start of the PCE through to time P#3 after the start time. When the inertial sensors of the controller sense that the (absolute value of) sensed motion is within P#7 at time t4 (which is P#3 after the start of the PCE), then the controller sends a left button (LB) press event (see "LB Press" in bottom graph of FIG. 21) to the controlled electronic device. After that point in time, the user can move the controller freely (by means of using their head/body) thereby moving the OOI until the PCE is ended. When the PCE ends, the motion of the OOI ends and a LB release event is sent to the controlled electronic device (see "LB Release" at time t5 in bottom graph of FIG. 21). Based on the operating system or application running on the controlled electronic device, the click and drag sequence can be used to select an area of the screen, to select and move an OOI, to zoom into a selected area on the display screen, and for other commands. In this example, PCE is started at time t3, followed by a LB Press event at time t4, followed by some OOI motion during the time period t4-t5, followed by a LB release event at time t5 when the PCE ends. Note that the "OOI Motion" curve in FIG. 21 (fourth graph) shows non-zero values only between time t6 through t5, because the absolute value of "Head Motion" (third graph) is greater than P#6 only starting at time t6, and the PCE reading (top graph) falls below the Expression Threshold at time t5 which ends the click and drag heuristic.

In a variation of the "click and drag heuristic" explained above, some controller embodiments can check for the head motion to be within the threshold of P#7 during the entire time period or a portion of the time period between the start of PCE (that is time t3) through P#3 milliseconds after the PCE start (that is through time t4). By checking for P#7 threshold earlier than time t4, some embodiments can make a determination to use the "OOI motion" heuristic rather than the "Click and Drag heuristic" without waiting till time t4 to make that determination. This can reduce or eliminate the lag time between the start of the PCE and start of the OOI motion, when the user intends to move the OOI only (and not perform "click and drag").

In the click and drag heuristic, if the user does not move the controller at a speed greater than the motion threshold P#6 during the entire duration of time between t4 and t5, then there will be no OOI motion during that time, thereby causing a LB Press event followed by a LB Release event. This will effectively result in a click/selection command on the controlled electronic device, albeit one which is performed in a slow, deliberate fashion. This can be advantageous to users who may prefer not having to perform a PCE within the time limit of P#5 as described in the heuristics for selection command.

Figure 22:
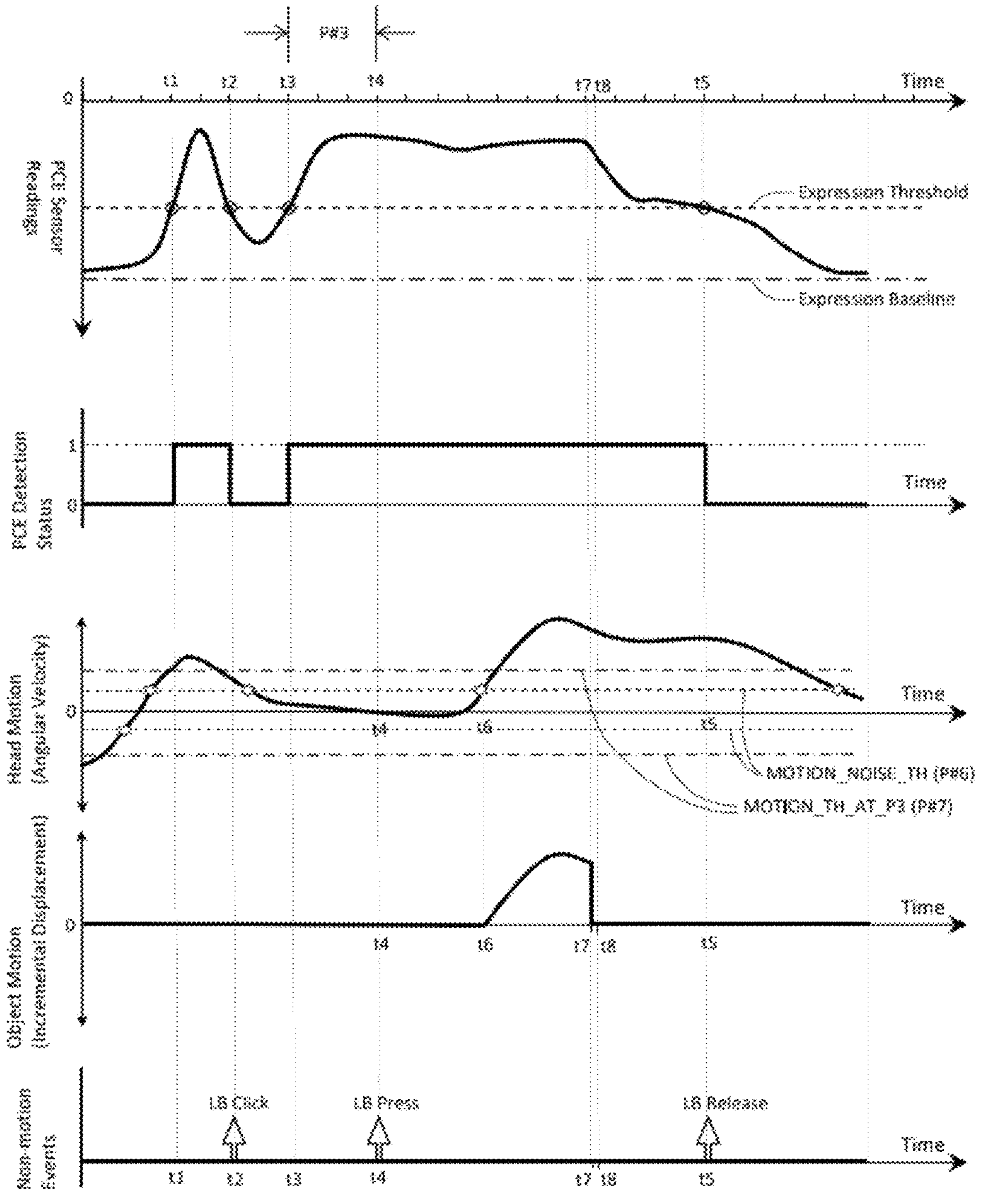
FIG. 22 shows exemplary heuristics for detection of primary controlling expression falling too fast based motion disablement.
Figure 23:
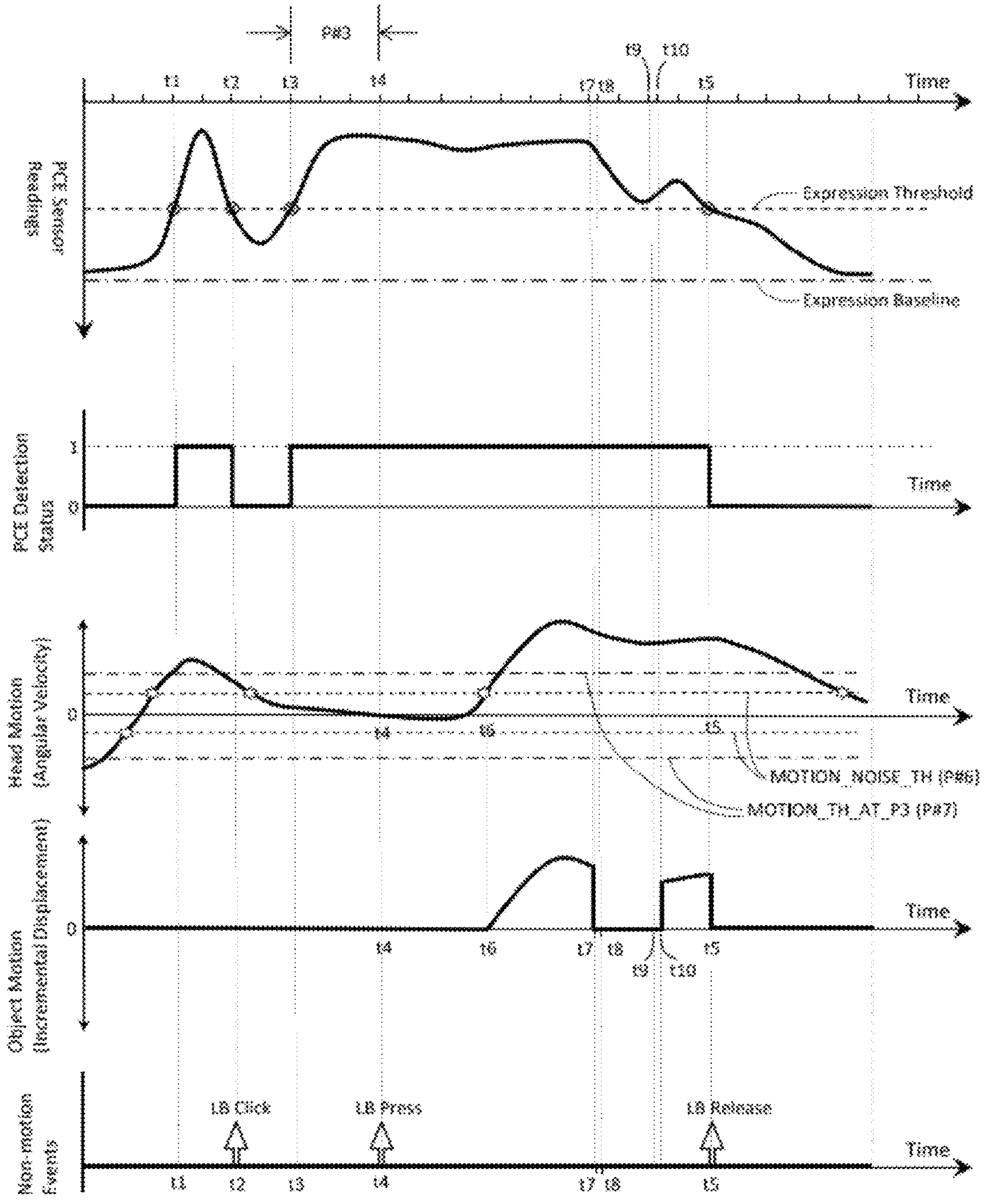
FIG. 23 shows exemplary heuristics for detection of primary controlling expression rising again based motion re-enablement.

A "PCE falling too fast" heuristic can be used for precision of OOI motion control. It is typical that while using the controller, when the user starts a PCE (or any FE for that matter), the FE sensor reading keeps rising/falling beyond the expression threshold. Similarly, when the user wishes to end the PCE, the FE sensor readings may take some finite time before they actually cross the threshold value to end the PCE. However, during this finite amount of time, as per the heuristics described above, the OOI may keep on moving, thereby possibly landing at a different position than where it was at the time the user decided to stop the PCE. FIG. 22 shows the situation where the user made a decision at time t7 to end the PCE and the PCE sensor reading indeed started to rise drastically, however, it took almost 200 ms before reaching close to the threshold and it took another 200 ms before actually crossing the threshold at time t5 and thereby ending the PCE at t5. However, this can result in excess motion of the OOI for about 400 ms which would have a significant impact on the usability of the controller and thereby the user experience. The user could be instructed to hold their head steady when getting ready to end the PCE, but that can have an impact on the usability of the controller. In the "PCE Falling Too Fast" heuristic, PCE sensor readings are compared between every two consecutive iterations to determine if the PCE reading is reducing at a greater rate (between those two consecutive iterations) than the rate prescribed by a threshold parameter P#9 (PCE_FALLING_TOO_FAST_TH of FIG. 19)). When this condition is detected, the control software stops sending OOI motion events until the end of the current PCE, unless the PCE starts increasing in subsequent consecutive iterations at a rate described by another threshold parameter P#10 (PCE_RISING_AGAIN_TH of FIG. 19). In FIGS. 20-24, since the PCE is a smile and the PCE sensor is a proximity sensor located close to the cheek, a smile actually decreases the distance between the cheek and the FE sensor thereby reducing the FE sensor reading. Therefore, when the smile is reducing, the PCE sensor reading is actually increasing. In this embodiment, parameters P#9 and P#10 can be expressed as absolute differences between PCE sensor readings from two consecutive iterations. In a variation, the values of P#9 and P#10 could also be expressed in terms of percentage difference between two consecutive iterations, or percentage of the expression threshold reading, or percentage of the expression baseline reading. In FIG. 22, the PCE sensor reading graph shows a change of greater than 15 (P#9) between readings taken during two consecutive iterations taking place at times t7 and t8 respectively. This stops the motion events from being sent to the controlled electronic device starting at time t8 through the end of the PCE at time t5 (see "OOI Motion," graph) even though the controller is experiencing motion greater than P#6. Note however that once the OOI motion is stopped (due to P#9 as described above), if the user starts increasing the expression before ending it, after a certain threshold (P#10), the OOI motion can be enabled again by sensing motion events to the controlled electronic device. This is illustrated by the top "PCE Sensor Reading" graph in FIG. 23. It shows the PCE falling too fast between the two consecutive iterations at times t7 and t8 which leads to stoppage of the motion events starting at time t8 as shown on the "OOI Motion" graph. Though the OOI motion is disabled for the present time, the PCE is still in progress as shown by the "PCE Detection Status" graph. Later, during the two consecutive iterations at times t9 and t10 an increase in level of PCE is detected, which is more than the amount specified by P#10 which resumes the OOI motion events which are sent to the controlled electronic device starting time t10. This behavior allows for restarting OOI motion without actually stopping and restarting a PCE event, in case the user had suddenly reduced the expression of PCE by mistake. This can be helpful if the user was in middle of a click and drag function.

Figure 24:
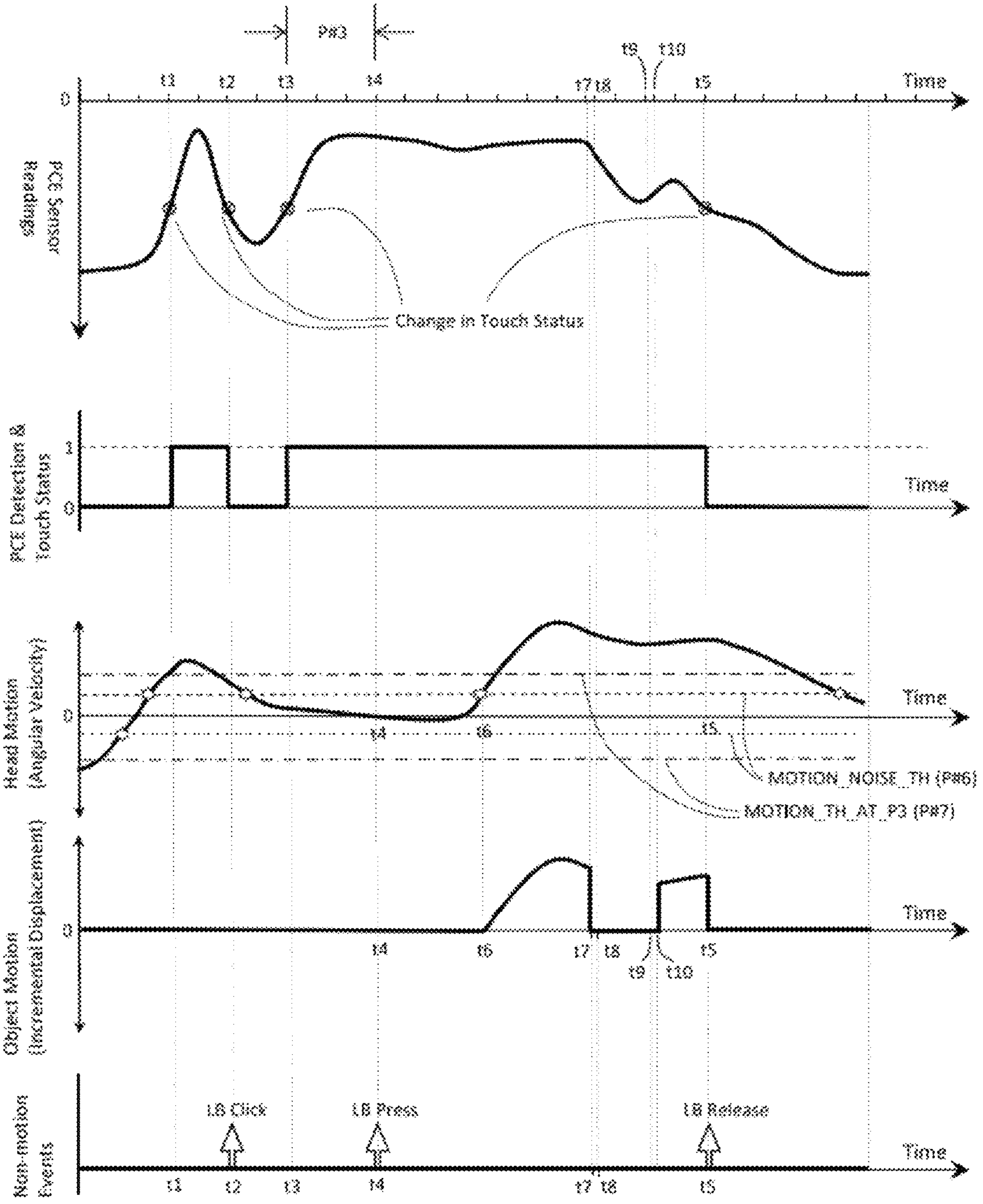
FIG. 24 shows exemplary heuristics for touch based proximity sensor.

Some controller embodiments may use a touch sensor for a FE sensor. Some touch sensors not only give a touch "on" or "off" reading, but also give a reading that generally correlates to proximity during the time period when touch is not yet detected and give a reading that correlates to the strength or area of touch after touch is detected. In this case, the PCE event can start when the FE/PCE sensor indicates that touch has been achieved and the PCE event can end when touch status reverts back to "off". This can eliminate the need to calculate expression threshold and the need for expression baseline. One embodiment uses an MPR121 proximity capacitive touch sensor controller (manufactured by Freescale, Inc.) as the FE sensor to sense PCE of a smile. See FIG. 24 for graphs of motion, click and "click-and-drag" heuristics, along with "PCE falling too fast" heuristic. FIG. 24 is almost identical to FIG. 23 which uses a regular proximity sensor. The primary difference is that in FIG. 24, the top FE/PCE sensor readings graph does not show the "Expression Threshold" or "Expression Baseline" line. The PCE detection is purely triggered by the change in touch status provided by the FE sensor as shown by the second "PCE Detection and Touch Status" graph. Note that if the PCE is a smile, then the smile starts when the facial muscle touches the sensor (i.e. Touch Status of 1), and stops when the facial muscle stops touching the sensor (i.e. Touch Status of 0). However, if the PCE was an eyebrow raise and if the embodiment has the PCE sensor touching the eyebrow/proximate area when in normal/resting position, then the PCE will start when the touch status changes to "off" (or 0) and the PCE will end when touch status changes back to "on" or 1. One advantage of using a proximity touch sensor is that the user gets an explicit and instantaneous feedback when the PCE is initiated or stopped by means of touching the sensor. The user can also physically see how far the sensor is from their face and thereby adjust the sensor's distance from their face to decide on the amount of expression of the PCE to get it to be detected or stopped. The part of the sensor that actually touches the body can be shaped and/or be provided physical characteristics that will make the touch detectable but in a non-intrusive or positive way. These physical characteristics can also be a matter of human preference and the user could be given a choice to adapt the experience of their touch by choosing different variations of the controller or accessories to go with the controller.

A controller embodiment can have FE/PCE detection based on the rate of change of the FE/PCE sensor reading and an accompanying minimum threshold amount of change. For example, if the PCE reading changes by 15% between two iterations, and the amount of change is at least 50, that change could be regarded as a change in PCE detection status. In this method of detection, the reading value at the first iteration of the two iterations is captured and then used as a temporary expression threshold value for ending that PCE event. Both the percent change and absolute amount of change could be turned into parameters (similar to other parameters in FIG. 19) and can be set/adjusted/manipulated by the user or the control software in a similar fashion. Note that a controller embodiment can use any combination of the PCE detection heuristics discussed for the purpose of detecting a PCE or any FE.

A variable gain factor can be used for ease and precision of small motions. Controlling an OOI requires not only speed for moving over large distances but often also accuracy in fine motions over short distances. Human beings are quite adept at using their heads in order to look at their surroundings. Neck muscles that control motion of the head are also quite capable of holding steady and of moving the head in small controlled motions. However, to enable ease of use as well as precision in control of a OOI using only head motion requires additional heuristics to help human beings with the contradictory demands of speed and accuracy of that task. A sensitivity or gain factor curve can be designed for that purpose. As mentioned above, some controller embodiments can use the following formula to arrive at the value of incremental translational motion T for the OOI based on the difference (ΔV) between a measured angular velocity reading at a particular instant in time from a baseline velocity reading:

$$T=\Delta V*\text{Scaling\_Factor}*\text{Gain\_Factor}$$

In the above formula, while the Scaling_Factor is a constant, the Gain_Factor is a variable that depends on ΔV itself. For sake of simplicity, use a Scaling_Factor of 1.0 in this discussion. FIG. 25 shows an example of the Gain_Factor variation/curve in the column labeled "Gain" which varies based on input motion as shown in the column labeled "Velocity." The column labeled "Output" is the product of the first two columns and signifies the output motion or translation of the OOI in 2D space at a given time. For example, if at a particular iteration, the angular velocity reading difference (ΔV) was 10, that would give rise to translation motion of 4 units (e.g. pixels) on the display screen at that instant in time. FIG. 26 shows graphs of gain and output versus velocity for the values listed in FIG. 25. FIG. 27 shows an expanded view of the graphs for velocity ranging from 0 to 16. Note that the Gain_Factor is such that the resultant output curve has several distinct regions:

Region 0: This area starts at angular velocity of zero through the value of parameter P#6 (MOTION_NOISE_TH), which is 1 deg/second in this embodiment. Since this is within the value of P#6, angular velocity will actually be ignored and the mouse motion events will not be triggered though Output is non-zero at velocity of 1.

Region 1: This is a flat region in the Output graph. In this example, this region ranges from angular velocity of 1-4 deg/second. The peculiarity of this region is that all the angular velocities in this region map to the same output of 1 in this embodiment which is the desired least motion attainable for this embodiment for the given Scale_Factor. This translates to 1 pixel movement per iteration. Note that by adjusting the Scale_Factor and iteration time, this can be made to achieve speed of just a few pixels/second, thereby giving the user greater precision and control at low speeds. This allows for users to be able to move the OOI at a constant low speed (equal to the lowest possible speed at which the OOI can be moved), even though they may not be able to move their head at a very low and constant angular velocity. This can help with precise placement of OOI on the screen by moving them possibly at a pixel by pixel rate. The size of this region can be shrunk or eliminated based on the ability of the user to control their heads when performing very slow motion, but this can help users with physical limitations or who are prone to tremors. This can also be helpful to users when using the controller in a vehicle, such as a trains or bus, which may experience small bumps during the ride. The size of this region can be changed by the user as part of the sensitivity settings of the controller.

Region 2: This region includes multiple areas of consecutively increasing slopes, leading to gentle rise in the Output. In this example, this region ranges from angular velocity of 4-8 deg/second. This allows for variable speed of motion, though at the lower speeds, allowing for finer control on motion of the OOI over short distances of movement. Note that some computer operating systems may require integer values (representing number of pixels the OOI is to be moved at any given instant) for motion commands. In this case, if the output values are being rounded off or truncated to integers, the remainder or deficit can be carried on to the next iteration(s) so that the magnitude of motion sent to the controlled electronic device in iteration(s) make up for the truncation or round off.

Region 3: This Output region is linear allowing for intuitive control of OOI motion over medium to large distances at medium to large speeds. In this embodiment, this region extends from angular velocities of 8-30 deg/second.

Region 4: This is a flat region at the higher end of input angular velocity. In this embodiment, it is shown to extend beyond 30 deg/second. This is useful to cap the maximum translational velocity (Output) of the object on the screen. This allows for ease of visually spotting OOI movement even when the controller may be moving at high and variable velocity, thereby again contributing to the ease of use of the controller.

As mentioned earlier, different controller embodiments can have different size regions or can even eliminate certain regions. These variations can be had even in the same embodiment based on the controller sensitivity settings. An expert user may not want to have Region 1 and Region 4 while working at a home/office environment, but may want to have Region 1 when traveling. On the other hand, a novice user or a user with physical challenges may always want to have both Region 1 and Region 4. All the region sizes could be driven based on parameters similar to ones shown in FIG. 19.

Although the Gain_Factor is presented as a multiplication factor, some embodiments can use table look-up methods to determine OOI motion output values based on input motion values (sensed by the inertial sensors). For example, a table like the one shown in FIG. 25 can be stored in memory and used as a lookup table to determine the Output (OOI motion value) given a particular Velocity as input without the explicit use of the Gain_Factor.

Many of the above heuristics imply use of angular velocity as the input motion, and use of the user's head to provide that input motion. However, other controller embodiments can use angular positions, translational velocities, angular or translational accelerations, tilt angles, heading or other measurable physical quantities that can be provided/affected by action of the head or another body part.

Audio feedback can be provided via an audio output component inside an ear plug of the controller when clicks are performed as well as when the pointer is moving. In other embodiments, audio output components could be located in other parts of the controller, for example, see FIGS. 14 and 18 where audio output components can be located in the temple part of the eyewear. Other types of feedback components can also be used, such as video feedback (for example, LEDs, LCD Displays, etc.) or haptic feedback components. Feedback can also be provided from the controlled electronic device. For example, sounds can be played from the controlled electronic device corresponding to various events, commands and motions; or graphical mechanisms (graphs, meters, etc.) can be used. Feedback can also be provided during initialization/calibration as well as during regular operation showing current sensor readings, baseline readings and their relation to the threshold, as well as FE detection statuses and other related information.

Some controller embodiments can have a joy stick mode of motion. The motion of a OOI can be made dependent on the deviation of the controller's position from its baseline position (rather than on the instantaneous angular velocity of the controller). In this situation, the OOI keeps on moving as long as the user has the expression indicating his/her intent to move the OOI, and the head has moved away from the baseline position. The orientation of the head can be captured in a combination of readings from gyroscopes, accelerometers, compass, tilt sensors or any other means. In one embodiment, the difference in the head position from the initial position is used to determine the instantaneous velocity of the OOI, wherein position difference in pitch and yaw directions are used to determine translational velocities of the OOI along Y and X axes of the display screen respectively. This can lead to velocities of the OOI that are proportional to the difference in position. A threshold on the position difference can be set so that a position difference less than this threshold value will be ignored. The joy stick mode has the advantage that the head does not need to move continuously to continuously move the OOI in a particular direction. Note that all the heuristics described earlier can also be used with this mode.

The controller can also include heuristics of auto-recalibration. When the user is not performing any PCE, baseline readings can be automatically updated/adjusted for selected sensors. This can be triggered if it is noticed that those sensor readings seem to have stabilized around a value that is sufficiently different from the baseline value though the controller is being worn correctly. As an example, if a FE/PCE sensor's readings are more than 5% different from the current baseline reading and they have been within 1% of each other for the last 30 seconds, then the baseline reading can be automatically updated to the average or median value observed during the last 30 seconds. Each of these numerical values in this example as well as the mode of finding a representative value can be turned into a parameter and can be changed on an embodiment by embodiment basis and/or directly or indirectly by the user or the Control Software in a similar fashion as other parameters listed in FIG. 19. Auto-recalibration of a sensor is typically performed when the sensor is not being actively used directly or indirectly at the time of auto-recalibration processing. This process can enhance fault tolerance of the controller in case it is being worn differently than how it was being worn during the regular calibration process. This process can also minimize impacts of change in ambient situations. For example, if in the course of use, the sensor arm of a proximity/touch sensor gets moved away from the position it was in during the previous calibration process, the auto-recalibration heuristics can update the baseline value. Note that other algorithms can also be used to achieve auto-recalibration.

The controller can also be used in conjunction with other hands free OOI control systems such as an eye gaze system. An eye gaze system uses camera(s) to monitor the position of the user's eyes to determine the cursor/pointer location on the computer's display screen. However, other computer commands (such as click-and-drag) are cumbersome with eye gaze tracking system since they typically involve multiple steps for the user and/or do not provide timely response. In this situation, the controller can be useful in multiple ways. The controller can be used along with the eye gaze tracking system to provide computer control commands (such as click, click-and-drag, etc.) while the eye gaze tracking system provides the cursor/pointer/OOI motion. Alternatively, the principles of the heuristics of the controller could be implemented in the eye gaze tracking system itself. One way is to modify the gaze tracking system to acquire facial expression information (using cameras or other means). It can then use the FE information and eye ball motion information (in place of head motion information) in the heuristics described in the previous sections to enable/disable cursor motion, as well as to generate other computer control commands.

Some controller embodiments can also be used as a drowsiness detector. In the embodiment in FIGS. 3 and 4, the sensor arm 2 can be trained in the direction of the closest eye for use as a drowsiness detector. The degree of eye closure can cause different levels of light to be reflected back onto the FE sensor 320. The amount of reflected light when eye is completely closed and completely open would be recorded during a calibration step and then used to detect full or partial eye closures. Using the duration of eye closure the controller can distinguish natural blinks (which are fast) from deliberate winks or closures due to drowsiness, which last much longer. Parameter P#8 (DROWSE_EYE_CLOSE_TIME_TH in FIG. 19) can be used as a threshold time to determine if the user is drowsy based on the time duration of an individual eye closure. Accordingly, if the user happens to close his/her eyes for at least this amount of time (P#8), then it is determined that the user is drowsy. It is also well known that eye closures during drowsiness have a peculiar pattern that can be recognized. Additionally, a combination of eye closure along with readings of a head droop or nod from inertial sensors 305 can be a further corroboration of drowsiness. The embodiment of FIG. 8 can also be used as a drowsiness detector where there is a dedicated sensor arm 1102 situated next to the eye. Alerts/alarms or other user feedback can be provided when drowsiness is detected. Any of the feedback mechanism can be used, such as audio, video, haptic, olfactory, etc. and those mechanisms can be present on the controller itself or in controlled electronic devices the controller is in communication with. For example, when the user is driving a car and if the controlled electronic device being communicated to is the car audio system, audio alerts could be sounded by the audio system to not only wake up the user but also alert others in the car.

FIG. 14 shows the controller 1700 where instead of sensor arms to hold various sensors, the controller 1700 mounts sensors on eyewear. The sensors can be connected to a main housing (not shown) either by a wired connection 1724 or wirelessly. The housing could be worn in or around the ear like the housing 1302 in FIG. 10, or the housing could be clipped to the eyewear itself, or it could be clipped somewhere else like the second housing 1520 of FIG. 12. Note that the eyewear controller 1700 can also house inertial sensors as well as its own power source. FIG. 14 shows various touch/proximity/FE sensors. Sensor 1702 can detect frowns or eye brow raises. Sensors 1704 and 1706 can also detect eye brows raises and frowns on an individual eye basis. Sensors 1720 and 1721 can detect nose twitching or side-to-side nose wiggles. The differences obtained in readings from the left and right side sensor 1720 can help determine level of symmetry of the motion of the face around the nose area and thereby distinguish nose twitches from side to side wiggles of nose and mouth. Further, nose twitches may also cause the entire eyewear to move at the same time, which can be detected by inertial sensors embedded in the eyewear, which can lead to further corroboration of the expression detection. Note that the main housing could also have inertial sensors, thereby allowing comparison of motion pattern obtained from eyewear inertial sensor with those obtained from the housing. This comparison can further enhance the confidence of detection of expressions such as nose twitches. Sensors 1716 and 1718 monitor motion in the upper cheek area, thereby can be used to detect smiles as well as jaw drops. When the user smiles, the distance between sensors 1716, 1718 and the cheek reduces whereas when the jaw drops, the distance increases. Touch detection can be used to further corroborate the findings. Further, comparisons of the trends in readings coming from different sensors can be done to distinguish one expression from another. For example, if the expression is getting stronger on the right side as sensed by sensors 1721 and 1718, but not much is changing on the left side as sensed by sensors 1716 and 1720, then it can be interpreted as a one sided smile using the right cheek. On the other hand, if the expression is getting stronger on the right side but weaker on the left side, which can indicate a nose wiggle to the right with some pouting action of the mouth.

Sensor 1722 on the underside of the nose bridge can be used to detect if the eyewear is being worn properly. This information can be advantageous for proper functioning of the controller, as a proper wear may be required for accurate PCE or FE detection. Just like any other sensor, a baseline reading for sensor 1722 from initialization/calibration phase can be used to compare future readings to continually assure that the controller is being worn properly. If it is detected that the controller is not being worn properly, a warning can be provided to the user through one of the feedback mechanisms on the controller 1700, or even via the controlled electronic device. Additional sensors could be provided around the body of the eyewear for detection of proper wear, such as on the inner rim of the frame facing the face, for example proximate to sensors 1702, 1704, 1706, 1716, 1718, 1720, 1721, as well as at other locations such on inner sides of the temples of the eyewear.

The controller 1700 can also be used for drowsiness detection. Sensor pairs 1708-1710 and 1712-1714 can be used to determine individual eye closure/blinking status. In one embodiment, sensors 1708 and 1712 have two distinct parts a first photo-reflective or proximity sensor part directed to the area of the eye closest to the sensor that can detect eye closure based on reading changes, and a second photo emitter part directed towards the sensors 1710 and 1714, respectively. The explanation of the mechanics of eye closure detection is explained in with regard to FIG. 15. FIG. 15 shows a top view of a user's head wearing eyewear 1820. An emitter 1802 is mounted on the nose pad 1818, and emits a radiation beam 1812 towards the receiver 1808. When the eye 1814 is open, the eyelashes 1804 and eyelid 1812 are out of the way of the radiation beam 1812, allowing most of the radiation to be received by the receiver 1808. However, when the eye comes close to closing or completely closes, the eyelashes 1804 and eyelid 1812 obstruct the radiation beam 1816, thereby causing a change in the reading by the receiver 1808. These changes are used to determine the eye closure status. FIG. 19 shows another embodiment where the a photo-reflective sensor 1904 shines light towards the white part of the eye ball and measures how much light is reflected back. The sensor reading changes as the eye opens or closes, thereby giving indication of opening/closing of the eye. Other types of proximity sensors can also be used instead of or in conjunction with photo-reflective sensors. For example, a capacitive proximity sensor could be used instead of or along with the photo-reflective sensor 1904 to sense capacitance change when the eyes go from open to closed state, thereby giving an indication of eye blink or closure.

Figure 18:
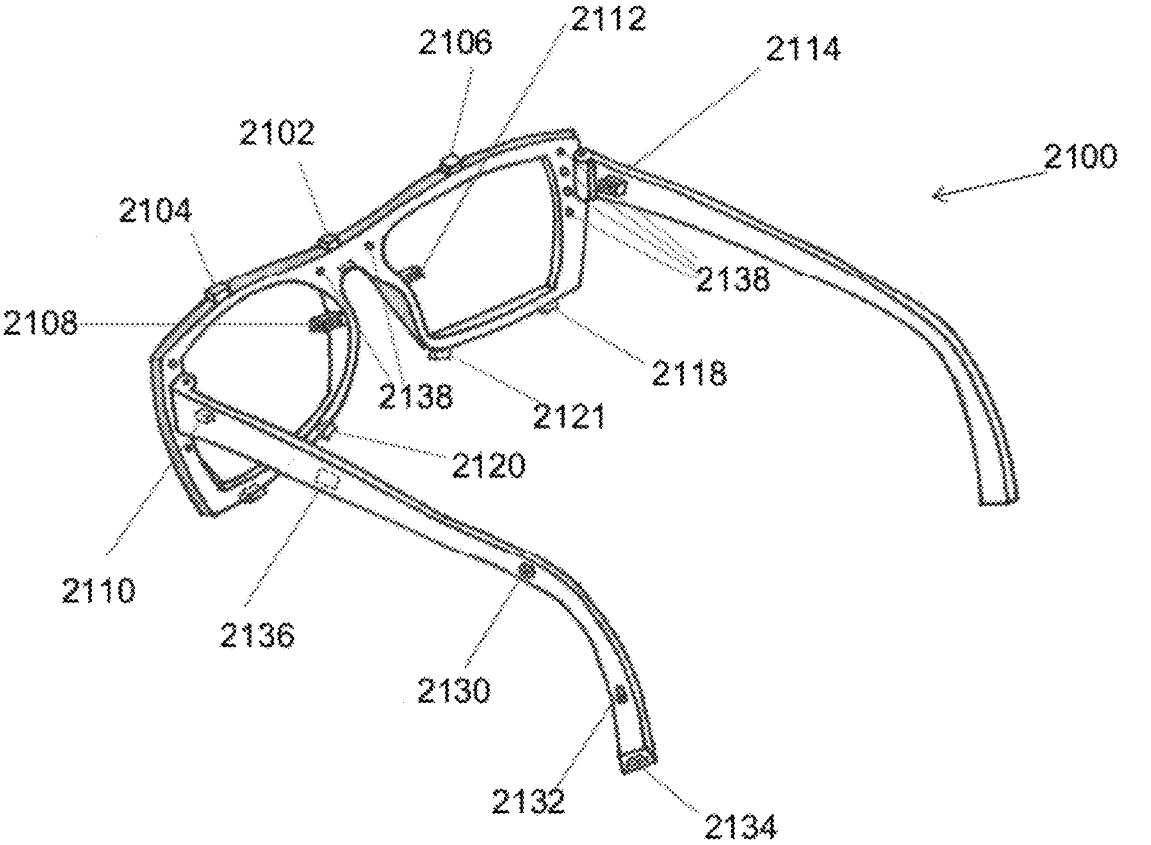
FIG. 18 shows an exemplary embodiment of a controller in the form of eyewear.

FIG. 18 shows a controller 2100 that can be used for drowsiness detection that is also based on eyewear. The difference between controller 2100 and controller 1700 (FIG. 14) is that controller 2100 eliminates the need for a separate housing by including a power source, audio output component, communication link and inertial sensors in the eyewear itself. The eyewear can have prescription and/or non-prescription lenses as well. The controller 2100 includes touch or proximity sensors 2102, 2104, 2106, 2118, 2120 and 2121; line of sight or proximity sensors 2108, 2110, 2112, 2114; and audio output device 2130, a power button 2132, a USB port 2134, inertial sensor 2136 and multiple LED lights 2138. The power source, microprocessor and other components can be included in the eyewear.

The controller also enables gathering of facial expression data without the need of cameras or having to be in front of a computer. For example, facial expressions data can be gathered when a user is doing chores in the house or even out shopping. Facial expression information can also be gathered in corporate settings, or private settings. Controller embodiments shown in FIGS. 8, 14 and 18 are designed for capturing a wide array of expressions though most other embodiments can also be adapted for capturing expressions. If facial expressions management (FEM) is desired, it can be selected during controller calibration. While performing FEM, the controller can gather data on user facial expressions as well as head/body motions along with time of the occurrences. This information can be processed in real-time by the controller, or sent to the controlled electronic device in real-time for processing. Alternatively, some or all of this data could be processed and/or sent to the controlled electronic device at specific times, or on certain events or upon explicit action by the user indicating his/her desire to do so. The facial expression data can also be attached to other data of user interest and stored with that data for use in the future. In some embodiments, pointer motion and drowsiness detection modes can be disabled when FEM is active, while other embodiments may have pointer motion, drowsiness detection and other functions enabled along with FEM. It is also possible to have some FE sensors solely focused on gathering data for FEM, thereby allowing FEM data gathering to proceed independently of PCE processing by the control software.

The parameter settings mentioned in this application and other values or settings can be changed as part of the calibration or changed by using a software program running on the controlled electronic device when the embodiment is connected to it. The controller 120 of FIG. 4 includes a flash button 11 that can be used as a mode selection switch to toggle between smile detection and drowsiness detection during initialization. Start or completion of initialization can also be triggered any time by a prolonged press of the flash button 11. When in calibration mode, the volume button 9 can be used to adjust sensitivity. Different combinations of the above listed buttons/controls and/or any new ones can be used for this purpose.

Some controller embodiments can also work as remote controls for other electronic devices such as home appliances. In such cases, selection command heuristics from the description above can be translated to an on-off toggle or set-reset toggle command for the current selected button. If the appliance has multiple buttons, the OOI motion heuristic can be used for selection of the button that is to the left/right or above/below the currently selected button. Once a desired button is selected, the click and drag heuristic can be used to dial the setting of the currently selected button up or down, left or right. Double clicks can be used to turn the entire device on or off. Feedback on which input mechanism (button/knob/dial, etc.) is currently selected and the actions being taken on that input mechanism can be provided using any of the feedback mechanisms described earlier either directly from the controlled electronic device or the controller itself, or both. For example, a selected button could be visually highlighted (by glowing), or the controlled electronic device could announce which button is selected, or its name could simply be listed on the display.

Optionally, additional communication links can be included to control household appliances versus the links for controlling electronic devices such as computers. The control software could be enhanced to include some popular functions of a universal remote and the housing of the controller could also have selection mechanisms for choosing which household appliance is to be controlled. Different expressions could also be used in choosing the electronic devices of interest before starting to control the selected device. Vocal commands could also be used to select the home appliance, as well as to control the entire function of the home appliance.

Some embodiments of the controller can also enhance or augment position/direction applications. The controller can interface with an electronic device that provides augmented reality functionality (for example, a mobile phone or GPS device) and provide it with heading and GPS information. Based on this information, a user can get or augment position/direction information without having to pull out the augmented reality device and point it in the direction of interest. This provides additional ease of use while using the electronic device.

Note that the heuristics mentioned in this document can be used in various combinations with each other. Instructions for performing the heuristics and methods disclosed herein may be included in a computer program product configured for execution by one or more processors. In some embodiments, the executable computer program product includes a computer readable storage medium (e.g., one or more magnetic disk storage devices, flash memory devices, or other non-volatile solid state memory devices) and an executable computer program mechanism embedded therein.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains.

We claim:

1. A system for controlling an electronic device, the system comprising:

a microprocessor running control software for:

receiving a first signal indicative of a facial expression of a user;

receiving a second signal indicative of motion or position of a part of the user's body; and generating a motion command for moving an object of interest on the electronic device based on the second signal; and a communication link for transmitting the motion command to the electronic device;

wherein the control software:

detects an active facial expression based on the first signal;

starts generating the motion command when the active facial expression is detected for at least a first minimum time duration; and stops generating the motion command when the active facial expression is no longer detected.

2. The system of claim 1, further comprising a first sensor, and wherein the first signal is based on a reading provided by the first sensor.

3. The system of claim 1, further comprising a second sensor, and wherein the second signal is based on a reading provided by the second sensor.

4. The system of claim 2, wherein the first sensor comprises a biometric sensor.

5. The system of claim 2, wherein the first sensor comprises a proximity sensor.

6. The system of claim 2, wherein the first sensor comprises a touch sensor.

7. The system of claim 2, wherein the first sensor comprises a mechanical sensor.

8. The system of claim 7, wherein the mechanical sensor comprises a mechanical switch.

9. The system of claim 3, wherein the first sensor comprises a biometric sensor.

10. The system of claim 9, wherein the biometric sensor comprises an EMG sensor.

11. The system of claim 2, wherein the first sensor comprises an image processing system.

12. The system of claim 2, wherein the first sensor comprises a camera.

13. The system of claim 3, wherein the second sensor comprises an image processing system.

14. The system of claim 3, wherein the second sensor comprises an eye gaze tracking system.

15. The system of claim 2, wherein the first signal comprises information indicative of the first sensor touching a facial muscle of the user.

16. The system of claim 2, wherein the first sensor comprises a combination of a proximity sensor, a touch sensor and a mechanical sensor.

17. The system of claim 3, wherein the second sensor comprises an inertial sensor.

18. The system of claim 3, wherein the second sensor senses at least one of motion, position and heading of the user's head.

19. The system of claim 18, wherein the second sensor comprises an image processing system.

20. The system of claim 1, wherein the control software detects an active facial expression when the first signal crosses a first start threshold or when the first signal changes by more than both a first minimum amount and a first minimum rate.

21. The system of claim 20, wherein after detecting an active facial expression, the control software determines the active facial expression is no longer detected when the first signal crosses a first end threshold.

22. A system for controlling an electronic device, the system comprising:

a microprocessor running control software for:

receiving a first signal indicative of a facial expression of a user;

receiving a second signal indicative of motion or position of a part of the user's body; and generating a selection command based on the first signal; and a communication link for transmitting the selection command to the electronic device;

wherein the control software generates the selection command when the first signal crosses and stays beyond a second start threshold for more than a first minimum selection hold time and less than a first maximum selection hold time.

23. A system for controlling an electronic device, the system comprising:

a microprocessor running control software for:

receiving a first signal indicative of a facial expression of a user;

receiving a second signal indicative of motion or position of a part of the user's body; and generating a click and drag command for moving an object of interest on the electronic device; and a communication link for transmitting the click and drag command to the electronic device;

wherein the control software:

starts the click and drag command when the first signal crosses and stays beyond a third start threshold for more than a second minimum selection hold time and the second signal stays below a first motion or position threshold;

after starting the click and drag command, moves the object of interest on the electronic device based on the second signal while the first signal continues to stay beyond a third end threshold; and terminates the click and drag command when the first signal crosses the third end threshold.

24. The system of claim 7, wherein the mechanical sensor comprises a flex sensor.

25. The system of claim 7, wherein the mechanical sensor comprises a piezoelectric sensor.

26. The system of claim 3, wherein the second sensor senses position of an eyeball of the user.

27. The system of claim 3, wherein the second sensor comprises a heading sensor.

28. The system of claim 1, wherein the second signal is indicative of motion or position of at least one of a head of the user and an eyeball of the user.

29. The system of claim 1, wherein the control software suspends the motion command when the first signal changes at a rate greater than a first Falling-Too-Fast threshold.

30. The system of claim 29, wherein the control software resumes the suspended motion command when the first signal changes at a rate greater than a first Rising-Again threshold.

31. The system of claim 23, wherein the control software suspends the click and drag command when the first signal changes at a rate greater than a first Falling-Too-Fast threshold.

32. The system of claim 31, wherein the control software resumes the suspended click and drag command when the first signal changes at a rate greater than a first Rising-Again threshold.

33. The system of claim 17, wherein the second sensor comprises an accelerometer.

34. The system of claim 17, wherein the second sensor comprises a gyroscopic sensor.

35. The system of claim 1, wherein the first signal is indicative of at least one of smiling, moving an eyebrow, opening an eye, closing an eye, opening a mouth, closing a mouth, clenching teeth, dropping a jaw, frowning, puffing a cheek, blinking, winking, chattering teeth, wiggling an ear, twitching a nose and wiggling a nose by the user.

36. The system of claim 15, wherein the first signal is indicative of at least one of smiling and moving an eyebrow by the user.

37. The system of claim 11, wherein the first signal is indicative of smiling by the user.

38. The system of claim 1, wherein the object of interest on the electronic device is a graphical object on a display screen of the electronic device.

39. The system of claim 1, wherein the object of interest on the electronic device is a selected button or dial or slider on the electronic device.

40. The system of claim 1, wherein the object of interest on the electronic device is a view angle or a camera angle on the electronic device.

41. The system of claim 1, wherein the object of interest on the electronic device is a mouse cursor or pointer on a display screen of the electronic device.

42. The system of claim 22, further comprising a first sensor, and wherein the first signal is based on a reading provided by the first sensor.

43. The system of claim 42, wherein the first sensor comprises a proximity sensor.

44. The system of claim 42, wherein the first sensor comprises a touch sensor.

45. The system of claim 42, wherein the first sensor comprises a mechanical sensor.

46. The system of claim 42, wherein the first sensor comprises an image processing system.

47. The system of claim 42, wherein the first signal comprises information indicative of the first sensor touching a facial muscle of the user.

48. The system of claim 47, wherein the first signal is indicative of smiling by the user.

49. The system of claim 22, wherein the first signal is indicative of smiling by the user.

50. The system of claim 22, wherein the generated selection command is at least one mouse click.

51. The system of claim 23, wherein the control software generates a first selection signal when the control software starts the click and drag command.

52. The system of claim 23, wherein the control software generates a second selection signal when the control software terminates the click and drag command.

53. The system of claim 23, further comprising a first sensor, and wherein the first signal is based on a reading provided by the first sensor.

54. The system of claim 53, wherein the first sensor comprises a proximity sensor.

55. The system of claim 53, wherein the first sensor comprises a touch sensor.

56. The system of claim 53, wherein the first sensor comprises a mechanical sensor.

57. The system of claim 53, wherein the first sensor comprises an image processing system.

58. The system of claim 23, further comprising a second sensor, and wherein the second signal is based on a reading provided by the second sensor.

59. The system of claim 58, wherein the second sensor comprises an image processing system.

60. The system of claim 58, wherein the second sensor comprises a gaze tracking system.

61. The system of claim 58, wherein the second sensor comprises an inertial sensor.

62. The system of claim 61, wherein the inertial sensor comprises an accelerometer.

63. The system of claim 61, wherein the inertial sensor comprises a gyroscope.

64. The system of claim 58, wherein the second sensor comprises a heading sensor.

65. The system of claim 23, wherein the object of interest on the electronic device is a graphical icon on a display screen of the electronic device.

66. The system of claim 23, wherein the object of interest on the electronic device is a mouse cursor or pointer on a display screen of the electronic device.

67. The system of claim 23, wherein the object of interest on the electronic device is a selected button or dial or slider on the electronic device.

68. The system of claim 23, wherein the object of interest on the electronic device is a view angle or a camera angle on the electronic device.

69. The system of claim 23, wherein the first signal is indicative of smiling by the user.

70. The system of claim 23, wherein the first signal is indicative of moving an eyebrow by the user.

71. The system of claim 2, wherein the first signal is indicative of smiling by the user.

72. The system of claim 2, wherein first signal is indicative of moving an eyebrow by the user.

73. The system of claim 53, wherein the first signal is indicative of smiling by the user.

74. The system of claim 53, wherein the first signal is indicative of moving an eyebrow by the user.

75. The system of claim 58, wherein the part of the user's body comprises a head of the user.

76. The system of claim 23, wherein the control software generates a mouse button press signal when the control software starts the click and drag command.

77. The system of claim 23, wherein the control software generates a mouse button release signal when the control software terminates the click and drag command.

78. The system of claim 21, wherein the first start threshold is substantially equal to the first end threshold.

79. The system of claim 23, wherein the third start threshold is substantially equal to the third end threshold.

80. The system of claim 22, further comprising a second sensor, and wherein the second signal is based on a reading provided by the second sensor.

81. The system of claim 80, wherein the second sensor comprises an image processing system.

82. The system of claim 80, wherein the second sensor comprises an inertial sensor.

83. The system of claim 42, further comprising a second sensor, and wherein the second signal is based on a reading provided by the second sensor.

84. The system of claim 83, wherein the second sensor comprises an image processing system.

85. The system of claim 84, wherein the first sensor comprises an image processing system.

* * * * *